United States Patent
Matsushita et al.

(10) Patent No.: US 6,427,104 B1
(45) Date of Patent: Jul. 30, 2002

(54) STEERING CONTROL APPARATUS

(75) Inventors: Masaki Matsushita; Takayuki Kifuku; Masahiro Kimata, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/036,532

(22) Filed: Jan. 7, 2002

(30) Foreign Application Priority Data

Jul. 30, 2001 (JP) ........................................ 2001-229685

(51) Int. Cl.[7] ................................................ G06F 7/00
(52) U.S. Cl. ............................ 701/41; 701/42; 150/446
(58) Field of Search ....................... 701/41, 42; 180/6.2, 180/410, 443, 446

(56) References Cited

U.S. PATENT DOCUMENTS

| 4,757,869 A | * | 7/1988 | Morishita et al. | .......... 180/79.1 |
| 6,163,746 A | * | 10/2000 | Moerbe | ........................ 701/41 |
| 6,250,420 B1 | * | 6/2001 | Brenner et al. | .............. 180/443 |

FOREIGN PATENT DOCUMENTS

| JP | 2000-184766 | 6/2000 |
| JP | 2000-184773 | 6/2000 |
| JP | 2000-279000 | 10/2000 |

OTHER PUBLICATIONS

Morimoto, Shigeo et al., "Variable Speed Drive System of Permanent Magnet Synchronous Motors with Flux–weakening Control", T. IEE Japan, vol. 112–D, No. 3, 1992 p. 292–298.

* cited by examiner

Primary Examiner—Richard M. Camby
(74) Attorney, Agent, or Firm—Sughrue Mion, PLLC

(57) ABSTRACT

A steering control apparatus is provided which is capable of alleviating a decrease in the output torque of a motor during high-speed steering. The steering control apparatus includes a motor 5, a motor current instruction value generation section 100a, 100b for generating a current instruction value for the motor 5, a motor current detection section 102a, 102b for detecting a current flowing through the motor 5, wherein the motor 5 is driven to rotate based on at least the current, which flows through the motor 5, and the current instruction value. The motor current instruction value generation section includes a correction section 100b for correcting the current instruction value which controls the magnetic field of a field magnet of the motor 5, the correction section being operable to correct the current instruction value for controlling the magnetic field of the field magnet of the motor 5 when a steering speed is fast.

19 Claims, 20 Drawing Sheets

FIG. 16
(a)
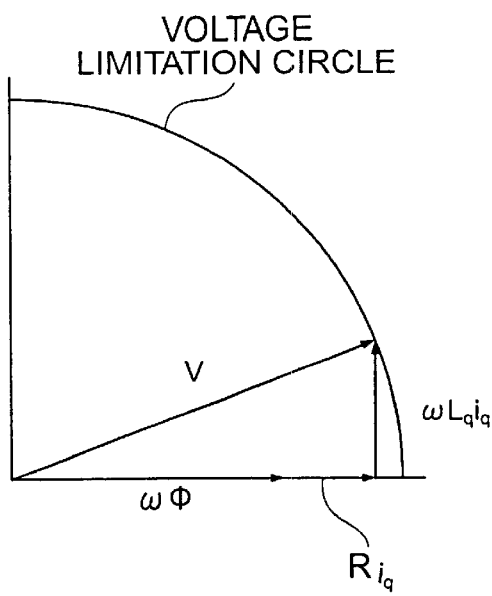
(b)
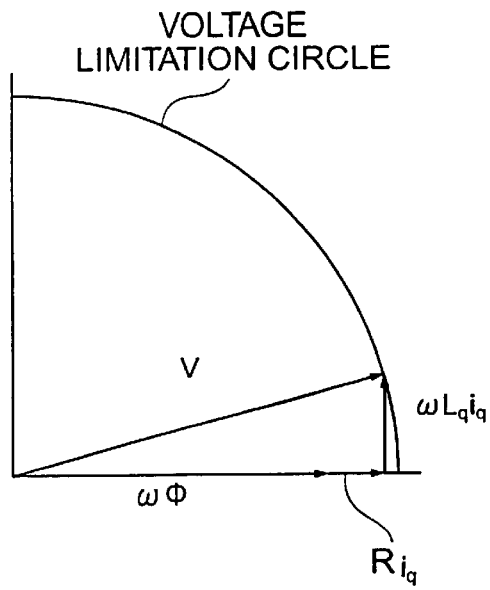
(c)
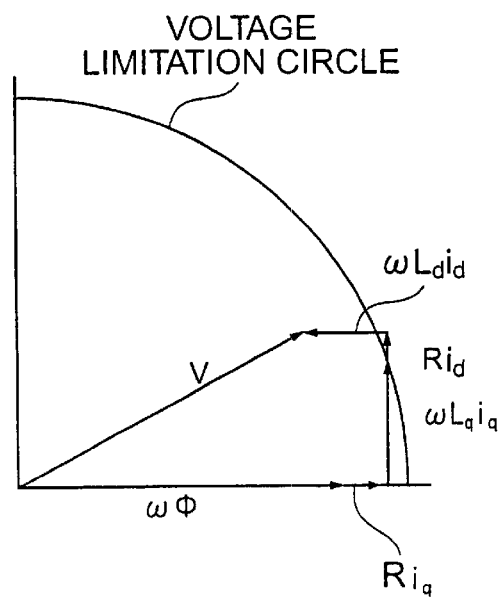
(d)
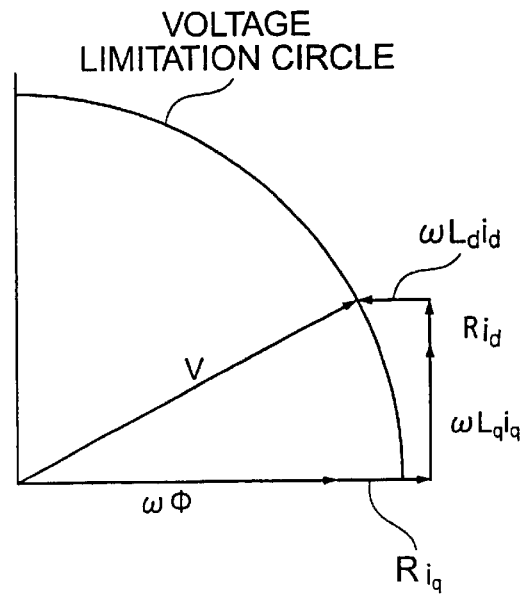

STEERING CONTROL APPARATUS

This application is based on Application No. 2001-229685, filed in Japan on Jul. 30, 2001, the contents of which are hereby incorporated by reference.

BACKGROUND OF THE INVENTION

1. Field of the Invention

The present invention relates to a steering control apparatus, and more specifically, it relates to an electric power steering control apparatus which controls an assisting force applied by a motor to a steering system of a vehicle based on at least the steering torque of a steering wheel and the speed of the vehicle when the steering wheel is steered to turn by a driver.

2. Description of the Related Art

There have been developed electric power steering apparatuses in which the speed of a vehicle and the steering torque applied to a steering column or shaft are detected, and a driving current determined according to the vehicle speed and the steering torque thus detected is supplied to a motor which generates an assisting force given to the steering shaft, so that the motor is thereby driven to rotate, thus assisting the force required to steer the vehicle by means of the rotating force of the motor to provide the driver with a pleasant steering sensation or feeling.

In the past, a DC motor with a brush has been used as a motor which gives an assisting force to a steering shaft of a vehicle, but it is impossible to perform field control with the DC motor and hence conventional electric power steering control apparatuses are not equipped with any means for generating a target current value used to carry out field control.

Moreover, there can be considered a steering control apparatus which employs a brushless motor in place of such a DC motor, as a motor for applying an assisting force to the steering shaft. In this case, owing to the absence of any brush within an electric motor, there will take place almost no abnormality or fault in the motor itself, and it also becomes possible to effect field control, which could not been carried out in the past as referred to above.

A brushless motor control apparatus performs a variety of calculations such as the calculation of a dq-axis target current based on an instruction torque, the detection of currents for respective phases (e.g., u phase and v phase) of a motor, the dq conversion of currents, the calculation of current deviations, the calculation of instruction voltage values, dq inversions, and the output of PWM control patterns. The detected respective phase currents are subjected to dq conversion in such a manner that they are controlled in a feedback manner to make their d-axis component and q-axis component equal to a d-axis target current and a q-axis target current, respectively. The d-axis component of each current means a wattless or reactive current, whereas the q-axis component is proportional to the torque of the motor when the motor is a synchronous motor and when the magnitude of the excitation magnetic field is constant. Therefore, the current feedback control for the synchronous motor is generally carried out in such a manner that the d-axis component of the detected current becomes zero and the q-axis component thereof becomes equal to a target value of the output torque.

In cases where a steering control apparatus is installed on a vehicle with a large weight, a large motor output torque is required, and there will be a problem that in cases where the motor characteristic is of the high-torque and low-rotation type, the output torque of the motor rapidly decreases upon rapid steering. As a result, in the case of an electric power steering control apparatus, there arises a problem that the steering operation rapidly becomes heavy upon rapid steering, whereas in the case of a steer-by-wire steering system, there is a problem in that the actual steering angle of the steered wheels does not follow the steering angle of the steering wheel upon rapid steering.

However, where the motor characteristic is of the low-torque and high-speed rotation type, it is necessary to increase the motor current in order to enlarge the motor output torque, and hence a large-sized motor of high power consumption is required. With a steering apparatus which is to be installed in a limited space, however, it becomes important to suppress the power consumption of a motor used therein and reduce the size thereof.

SUMMARY OF THE INVENTION

The present invention is intended to obviate the various problems as referred to above, and has for its object to provide a steering control apparatus which is capable of alleviating a decrease in the output torque of a motor during high-speed steering without increasing the size thereof.

Bearing the above object in mind, according to the present invention, there is provided a steering control apparatus including a motor, a motor current instruction value generation section for generating a current instruction value for the motor, and a motor current detection section for detecting a current flowing through the motor, the motor being driven to operate based on at least the current flowing through the motor and the current instruction value, wherein the motor current instruction value generation section includes a correction section for correcting a current instruction value which controls a magnetic field of a field magnet of the motor, the correction section being operable to correct the current instruction value for controlling the magnetic field of the motor field magnet when a steering speed is high, In a preferred form of the present invention, the steering control apparatus further comprises a motor control section for performing torque control on the motor in accordance with a torque instruction through vector control which is represented by a two-phase rotating magnetic flux coordinate system having a direction of a field current oriented in a d-axis direction and a direction perpendicular to the d-axis oriented in a q-axis direction, wherein the correction section corrects a d-axis current instruction value in such a manner that a d-axis current is controlled to such a predetermined value as to weaken the magnetic field of the motor field magnet when a deviation between the q-axis current instruction value and a q-axis current detection value becomes not less than a predetermined value.

In another preferred form of the present invention, the correction section increases a negative d-axis current instruction value for weakening the magnetic field of the motor field magnet when the q-axis current deviation is not less than a first predetermined value, and decreases the negative d-axis current instruction value for weakening the magnetic field of the motor field magnet when the q-axis current deviation is not greater than a second predetermined value.

In a further preferred form of the present invention, the d-axis current instruction value is limited within a preset range.

In a still further preferred form of the present invention, the steering control apparatus further comprises a stator phase current instruction value generation section for generating stator respective phase current instruction values from the q-axis current instruction value, wherein the current instruction value for controlling the magnetic field of the motor field magnet is corrected based on a deviation between at least one of the stator phase current instruction values and an actual corresponding stator phase current value in place of the q-axis current deviation.

In a yet further preferred form of the present invention, the steering control apparatus further comprises a reference steering torque generation section for generating a reference steering torque which is used to determine whether the magnetic field of the motor field magnet is to be weakened, wherein when the steering torque becomes not less than the reference steering torque, the correction section corrects the current instruction value to such a prescribed value as to weaken the magnetic field of the motor field magnet.

In a further preferred form of the present invention, the reference steering torque generation section generates the reference steering torque as a function of at least a vehicle speed.

In a further preferred form of the present invention, the steering control apparatus further comprises a steering speed detection section for detecting a steering speed of a steering wheel, wherein the correction of the current instruction value for controlling the magnetic field of the motor field magnet is effected such that when the steering speed of the steering wheel becomes not less than a predetermined value, the current instruction value is corrected to such a prescribed value as to weaken the magnetic field of the motor field magnet.

In a further preferred form of the present invention, the steering control apparatus further comprises: a motor control section for performing torque control on the motor in accordance with a torque instruction through vector control which is represented by a two-phase rotating magnetic flux coordinate system having a direction of a field current oriented in a d-axis direction and a direction perpendicular to the d-axis direction oriented in a q-axis direction; a speed detection section for detecting a rotational speed of the motor; and a voltage limitation value generation section for generating a voltage limitation value to a voltage applied to the motor; wherein the correction section determines a d-axis current value for setting a working point on a voltage limitation circle through calculations based on at least the rotational speed of the motor, a q-axis current instruction value, a stator winding resistance, a stator winding reactance and a motor counter electromotive voltage constant, and effects correction in such a manner that when the d-axis current value determined through calculations is a current value which weakens the magnetic field of the motor field magnet more than a d-axis current instruction value does, the d-axis current value determined through calculations becomes equal to the d-axis current instruction value.

In a further preferred form of the present invention, the steering control apparatus further comprises a power supply voltage detection section for detecting a power supply voltage, wherein the voltage limitation value generation section generates, as a voltage limitation value, a value obtained by multiplying the power supply voltage by a predetermined coefficient.

In a further preferred form of the present invention, the motor comprises a field winding type motor, and the apparatus further comprises a motor control section for performing torque control on the motor in accordance with a torque instruction in such a manner that a field winding current instruction value is corrected when a deviation between an armature current instruction value and an armature current detection value becomes not less than a predetermined value.

In a further preferred form of the present invention, the field winding current instruction value is corrected in such a manner that it is decreased when the armature current deviation is not less than a first predetermined value, and it is increased when the armature current deviation is not greater than a second predetermined value.

In a further preferred form of the present invention, the field winding current instruction value is limited to a preset minimum value.

In a further preferred form of the present invention, the correction section corrects the current instruction value with a correction value which is determined through calculations.

In a further preferred form of the present invention, the correction section corrects the current instruction value with a correction value which is obtained by referring to a table prepared in advance.

In a further preferred form of the present invention, the d-axis current instruction value is limited to a value which is obtained by vector subtracting a q-axis current value from a preset maximum current vector value.

In a further preferred form of the present invention, an integrated value of the deviation is used in place of the deviation.

In a further preferred form of the present invention, the correction section corrects the current instruction value for controlling the magnetic field of the motor field magnet only when a vehicle speed is not less than a predetermined value.

In a further preferred form of the present invention, the correction section corrects the current instruction value for controlling the magnetic field of the motor field magnet only when a steering torque is not less than a predetermined value.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIGS. 16A through 16D are dq-axis vector diagrams for explaining magnetic flux weakening control according to the seventh embodiment of the present invention.

DESCRIPTION OF THE PREFERRED EMBODIMENTS

Now, preferred embodiments of the present invention will be described in detail with reference to the accompanying drawings by taking, as an example, the case where the present invention is applied to an electric power steering control apparatus.

Embodiment 1

In a first embodiment of the present invention, a d-axis target current is corrected as a function of a deviation in a q-axis current thereby to decrease the magnetic field of a field magnet of a motor upon high-speed steering in which the deviation in the q-axis current increases due to voltage saturation, thus alleviate an increase in steering torque during such high-speed steering.

Figure 1:
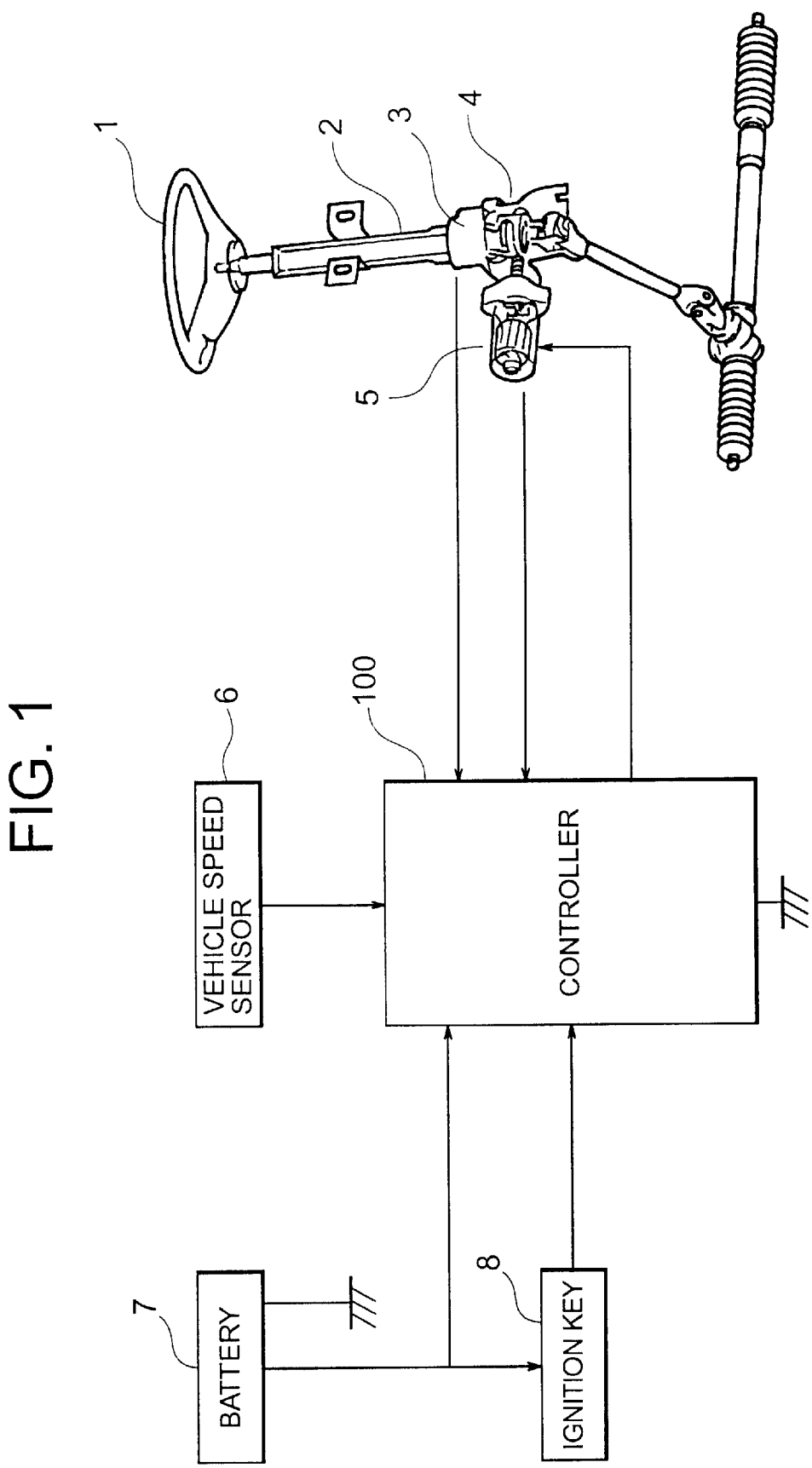
FIG. 1 is a constructional view illustrating a first embodiment of the present invention.

FIG. 1 is a constructional view illustrating an electric power steering control apparatus according to this first embodiment of the present invention.

In this figure, a motor 5, which generates steering assisting torque, is connected through a reduction gear 4 with one end of a steering column or shaft 2, the other end of which is connected with a steering wheel 1. Also connected with the steering shaft 2 is a torque sensor 3 for detecting the steering torque of the steering wheel 1 to generate a corresponding torque detection value.

A controller 100 serves to determine a steering assisting torque based on the torque detection value of the torque sensor 3 and a vehicle speed detection value detected by a vehicle speed sensor 6, and assist the steering operation of the steering wheel 1 by driving the motor 5 to generate the steering assisting torque thus determined. A battery 7 is connected with an ignition key 8 and the controller 100.

Figure 2:
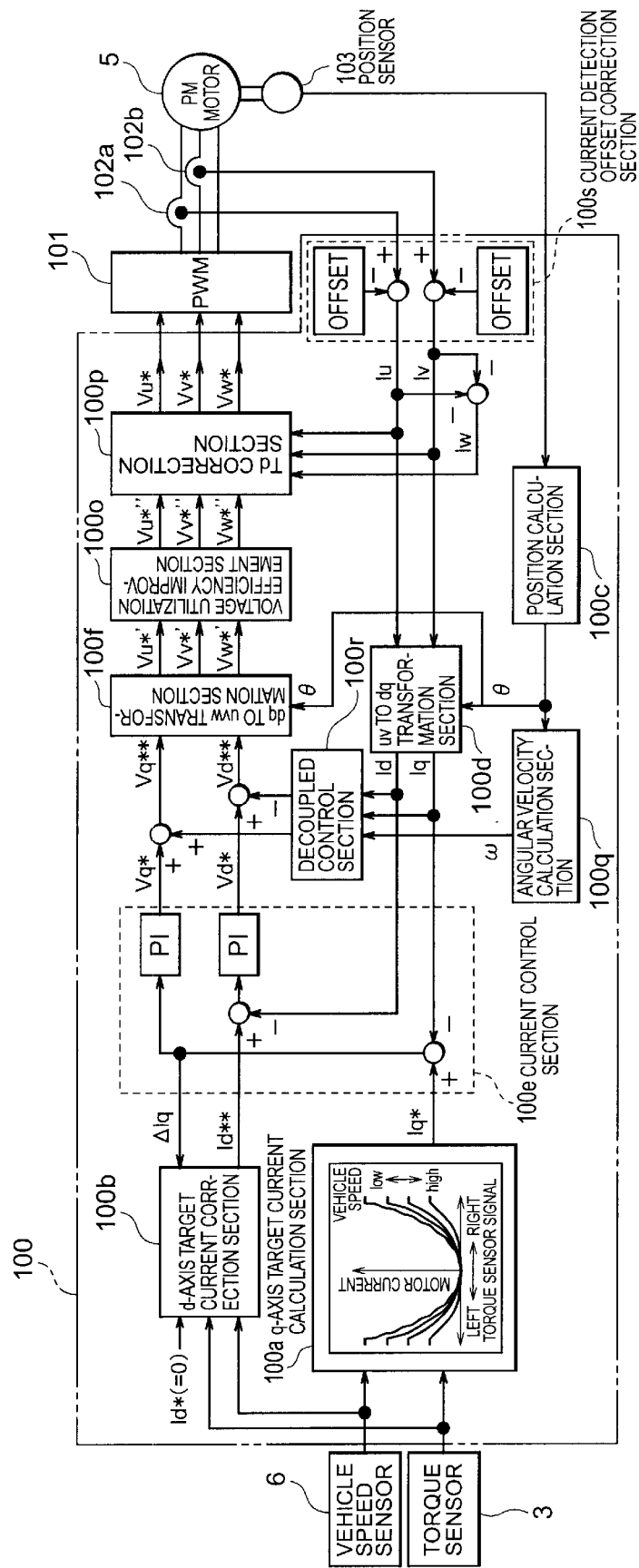
FIG. 2 is a block diagram illustrating functions of the first embodiment of the present invention.

FIG. 2 functionally illustrates an example of the electric power steering control apparatus according to the first embodiment of the present invention in which a PM brushless motor is used as a steering assisting motor.

In FIG. 2, a reference numeral 100 designates a microcomputer which performs steering assisting control with its software configuration being illustrated in a functional block diagram.

In FIG. 2, the microcomputer 100 includes a q-axis target current calculation section 100a, a d-axis target current correction section 100b acting as a correcting section, a position calculation section 100c, a uv to dq transformation section 100d, a current control section 100e, a dq to uvw transformation section 100f acting as a stator phase current instruction value generation section, a voltage utilization efficiency improvement section 100o, a dead band (Td) correction section 100p, an angular velocity calculation section 100q acting as a speed detection section, a decoupled control section 100r, and a current detection offset correction section 100s. Here, note that the q-axis target current calculation section 100a and the d-axis target current correction section 100b together constitute a motor current instruction value generation section.

The q-axis target current calculation section 100a performs predetermined calculations based on the torque detection signal of the torque sensor 3, which detects the steering torque of the steering wheel 1, and the vehicle speed detection signal of the vehicle speed sensor 6, which detects the vehicle speed, determines a q-axis target current value (Iq*) for driving the motor 5 in the form of a PM brushless motor, and supplies the q-axis target current value thus determined to the current control section 100e.

The position calculation section 100c determines an electrical angle θ through calculations based on the positional detection signal of a position sensor 103, and supplies the electrical angle θ thus determined to the angular velocity calculation section 100q, the uv to dq transformation section 100d and the dq to uvw transformation section 100f.

The angular velocity calculation section 100q determines a motor rotational angular velocity ω through calculations based on the electrical angle θ, and supplies it to the decoupled control section 100r.

The current detection offset correction section 100s calculates respective phase detection currents (Iu, Iv) by subtracting the amounts of respective phase offsets from phase current values detected by current sensors 102a, 102b, respectively, and supplies them to the Td correction section 100p and the uv to dq transformation section 100d.

The uv to dq transformation section 100d performs dq conversion based on the detected phase current values (Iu, Iv) and the electrical angle θ, and supplies thus converted dq-axis currents (Id, Iq) to the decoupled control section 100r and the current control section 100e.

Figure 3:
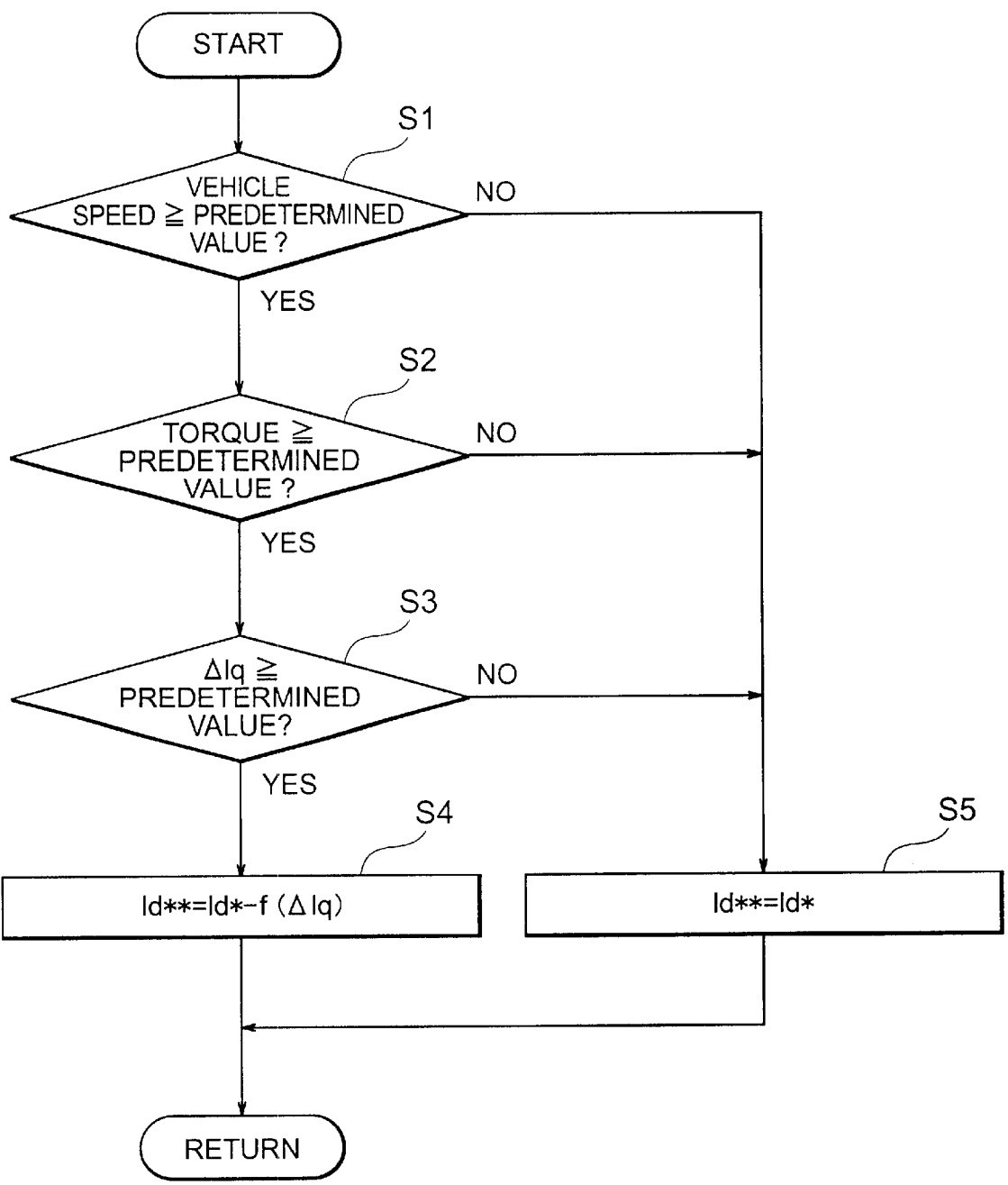
FIG. 3 is a flow chart illustrating d-axis target current correction processing according to the first embodiment of the present invention.

FIG. 3 is a flow chart for explaining the processing performed by the d-axis target current correction section 100b.

In step S1, it is determined whether the vehicle speed detected by the vehicle speed sensor 6 is not less than a predetermined value, and when the detected vehicle speed is less than the predetermined value, the d-axis target current (Id*) is adopted as a corrected d-axis target current (Id**) in step S5, whereas when the detected vehicle speed is not less than the predetermined value, the control process advances to the processing of step S2. Then, in step S2, it is determined whether the steering torque detected by the torque sensor 3 is not less than a predetermined value, and when the detected steering torque is less than the predetermined value, the d-axis target current (Id*) is adopted as the corrected d-axis target current (Id**) in step S5, whereas when the detected steering torque is not less than the predetermined value, the control process advances to the processing of step 3. In step S3, it is determined whether a q-axis current deviation (ΔIq) is not less than a predetermined value, and when the q-axis current deviation (ΔIq) is less than the predetermined value, the d-axis target current (Id*) is adopted as the corrected d-axis target current (Id**) in step S5, whereas when the q-axis current deviation (ΔIq) is not less than the predetermined value, the control process advances to the processing of step 4. In step 4, the d-axis target current is corrected by subtracting a corrected current value (f(ΔIq)), which is obtained as a function of the q-axis current deviation (ΔIq), from the d-axis target current (Id*), and the thus corrected d-axis target current (Id**) is supplied to the current control section 100e.

The current control section 100e performs proportional and integral (PI) control based on deviations between the dq-axis target currents (Id**, Iq*) and the corresponding detected dq-axis currents (Id, Iq), and generates dq-axis target application voltages (Vd*, Vq*).

The control section 100r calculates non-interfering voltages based on the dq-axis detection currents (Id, Iq) and the motor angular velocity ω, and corrects the dq-axis target application voltages (Vd*, Vq*) to generate corrected dq-axis target application voltages (Vd, Vq), which is supplied to the dq to uvw transformation section 100f.

The dq to uvw transformation section 100f performs dq inversion based on the corrected dq-axis target application voltages (Vd, Vq) and the electrical angle θ to generate three-phase target application voltages (Vu*', Vv*', Vw*'), which are supplied to the voltage utilization efficiency improvement section 100o.

Figure 4:
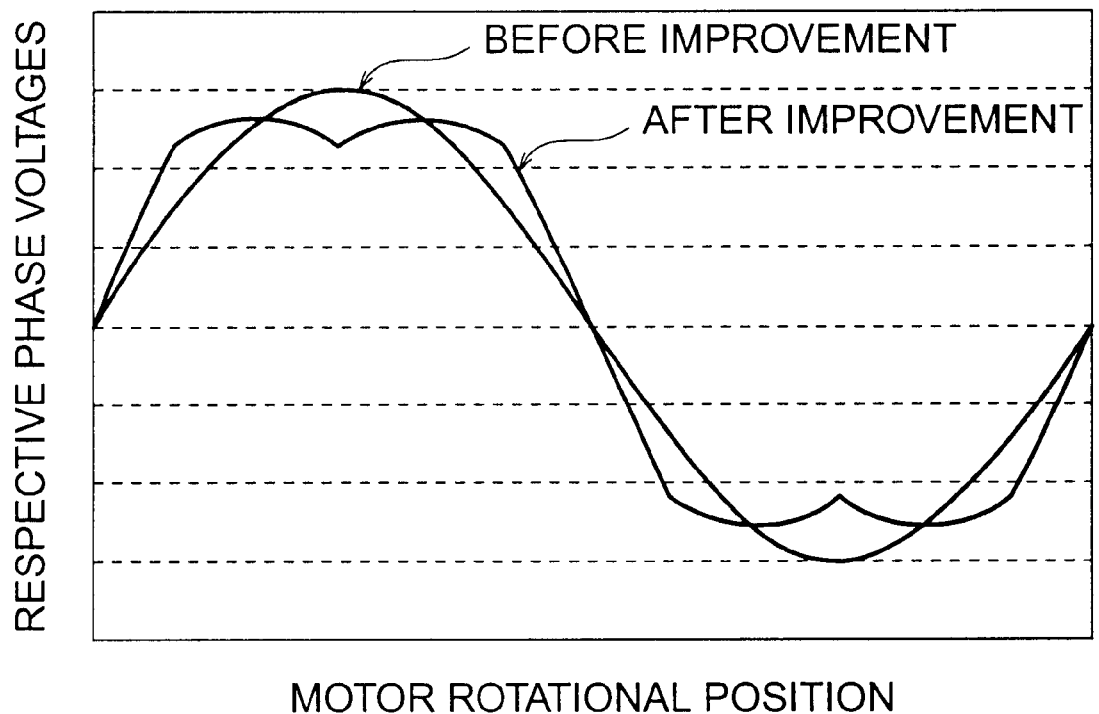
FIG. 4 is a view illustrating examples of waveforms before and after modulation in the first embodiment of the present invention.

To improve the voltage efficiency, the voltage utilization efficiency improvement section 100o modulates the three-phase target application voltages (Vu*', Vv*', Vw*') into a spatial voltage vector, and supplies the thus modulated three-phase target application voltages (Vu*", Vv*", VW*") to the Td correction section 100p. Examples of waveforms before and after such modulation are illustrated in FIG. 4. In FIG. 4, the axis of ordinate represents the values of the three-phase target application voltages, and the axis of abscissa represents the rotational position of the motor.

The Td correction section 100p performs dead band compensation for the modulated three-phase target application voltages (Vu*", Vv*", Vw*") based on the detected current values (Iu, Iv, Iw), and supplies the thus compensated three-phase target application voltages (Vu*, Vv*, Vw*) to a driving section 101.

With the electric power steering control apparatus as constructed above, owing to the provision of the d-axis target current correction section 100b, the magnetic field of the motor field magnet is weakened during high-speed steering in which the q-axis current deviation is increased due to voltage saturation so that a decrease in the output torque of the steering assisting motor upon rapid steering can be alleviated, thus making it possible to reduce the increasing steering torque during such rapid steering.

Although in the first embodiment, the electric power steering control apparatus has been taken as an example, the present invention may instead be applied to a steer-by-wire steering control apparatus.

In the case of such a steer-by-wire steering control apparatus, owing to the provision of the d-axis target current correction section 100b, the magnetic field of the motor field magnet can be weakened upon high-speed steering in which the q-axis current deviation is increased due to voltage saturation, whereby a decrease in the motor output torque upon rapid steering can be alleviated, thus improving the followability of the actual steering angle with respect to the operator's induced steering angle during rapid steering.

Embodiment 2

In a second embodiment of the present invention, the d-axis target current is corrected with a current value which is obtained by referring to a table, which has been prepared in advance using the q-axis current deviation as a parameter, thereby to decrease the magnetic field of the motor field magnet upon high-speed steering in which the q-axis current deviation increases due to voltage saturation, thus alleviating an increase in steering torque during such high-speed steering.

Figure 5:
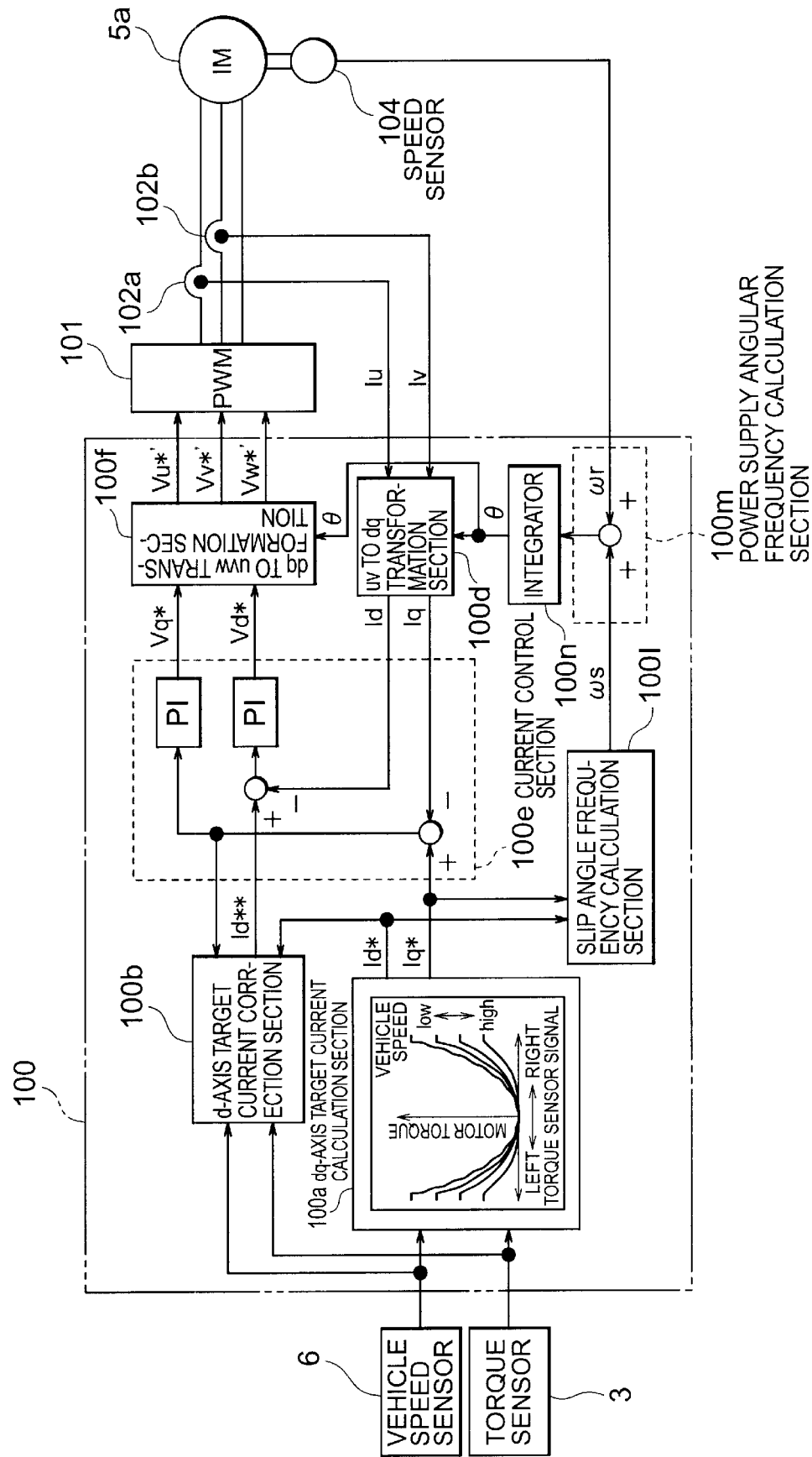
FIG. 5 is a block diagram illustrating a second embodiment of the present invention.

FIG. 5 functionally illustrates an example of an electric power steering control apparatus according to the second embodiment of the present invention in which an induction motor is used as a steering assisting motor. In FIG. 5, description will be made with the same or corresponding parts as those in FIG. 2 being identified by the same symbols.

In FIG. 5, there is illustrated a functional block diagram of a microcomputer, generally designated at 100, which performs steering assisting control by executing software incorporated therein. The microcomputer 100 of this second embodiment includes a dq-axis target current calculation section 100a, a d-axis target current correction section 100b, a slip angle frequency calculation section 100l, a power supply angular frequency calculation section 100m which calculates a power supply angular frequency from a slip angle frequency ωs and a motor rotational speed ωr of an induction motor 5a detected by a speed sensor 104, an integrator 100n which calculates an angle θ from the power supply angular frequency, a uv to dq transformation section 100d, a current control section 100e, and a dq to uvw transformation section 100f.

Figure 6:
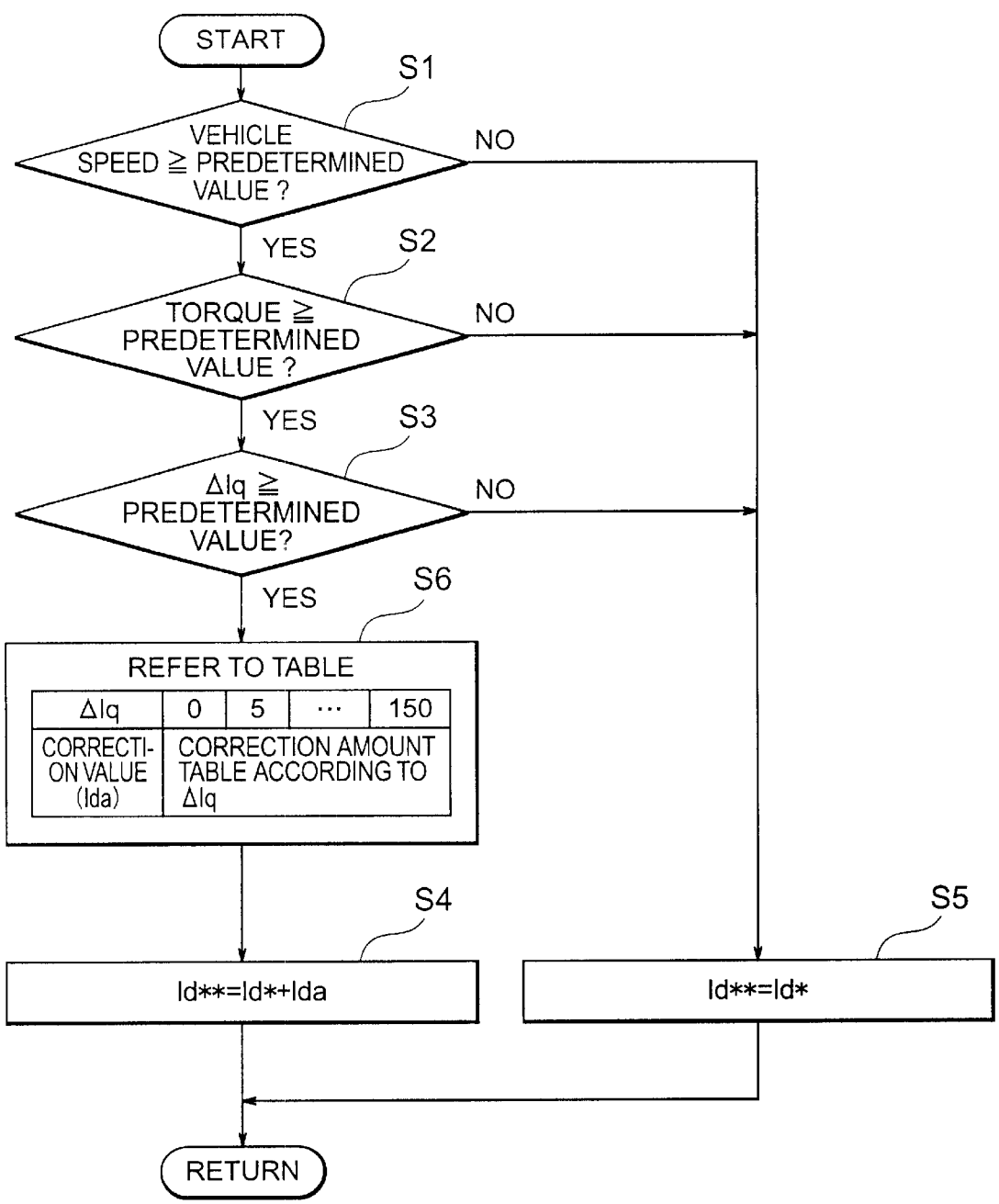
FIG. 6 is a flow chart illustrating d-axis target current correction processing in the second embodiment of the present invention.

FIG. 6 is a flow chart for explaining the processing performed by the d-axis target current correction section 100b in the electric power steering control apparatus according to the second embodiment of the present invention.

In step S1, it is determined whether the vehicle speed detected by the vehicle speed sensor 6 is not less than a predetermined value, and when the detected vehicle speed is less than the predetermined value, the d-axis target current (Id*) is adopted as a corrected d-axis target current (Id**) in step S5, whereas when the detected vehicle speed is not less than the predetermined value, the control process advances to the processing of step S2. Then, in step S2, it is determined whether the steering torque detected by the torque sensor 3 is not less than a predetermined value, and when the detected steering torque is less than the predetermined value, the d-axis target current (Id*) is adopted as the corrected d-axis target current (Id**) in step S5, whereas when the detected steering torque is not less than the predetermined value, the control process advances to the processing of step S3.

In step S3, it is determined whether the q-axis current deviation (ΔIq) is not less than a predetermined value, and when the q-axis current deviation (ΔIq) is less than the predetermined value, the d-axis target current (Id*) is adopted as the corrected d-axis target current (Id**) in step S5, whereas when the q-axis current deviation (ΔIq) is not less than the predetermined value, the control process advances to the processing of step S6. In step S6, a corrected current value (Ida) is determined by referring to a table, which has been prepared in advance using the q-axis current deviation (ΔIq) as a parameter. In step S4, the d-axis target current is corrected by subtracting the corrected current value (Ida) from the d-axis target current (Id*), and the thus corrected d-axis target current (Id**) is supplied to the current control section 100e.

Embodiment 3

In a third embodiment of the present invention, the d-axis target current value is corrected in such a manner that it is decreased when an integrated value of the q-axis current deviation is not less than a first predetermined value 1, and increased when the integrated q-axis current deviation is not greater than a second predetermined value 2, whereby the magnetic field of the motor field magnet is weakened upon high-speed steering in which the q-axis current deviation increases due to voltage saturation, thus alleviating an increase in the steering torque during such high-speed steering.

Figure 7:
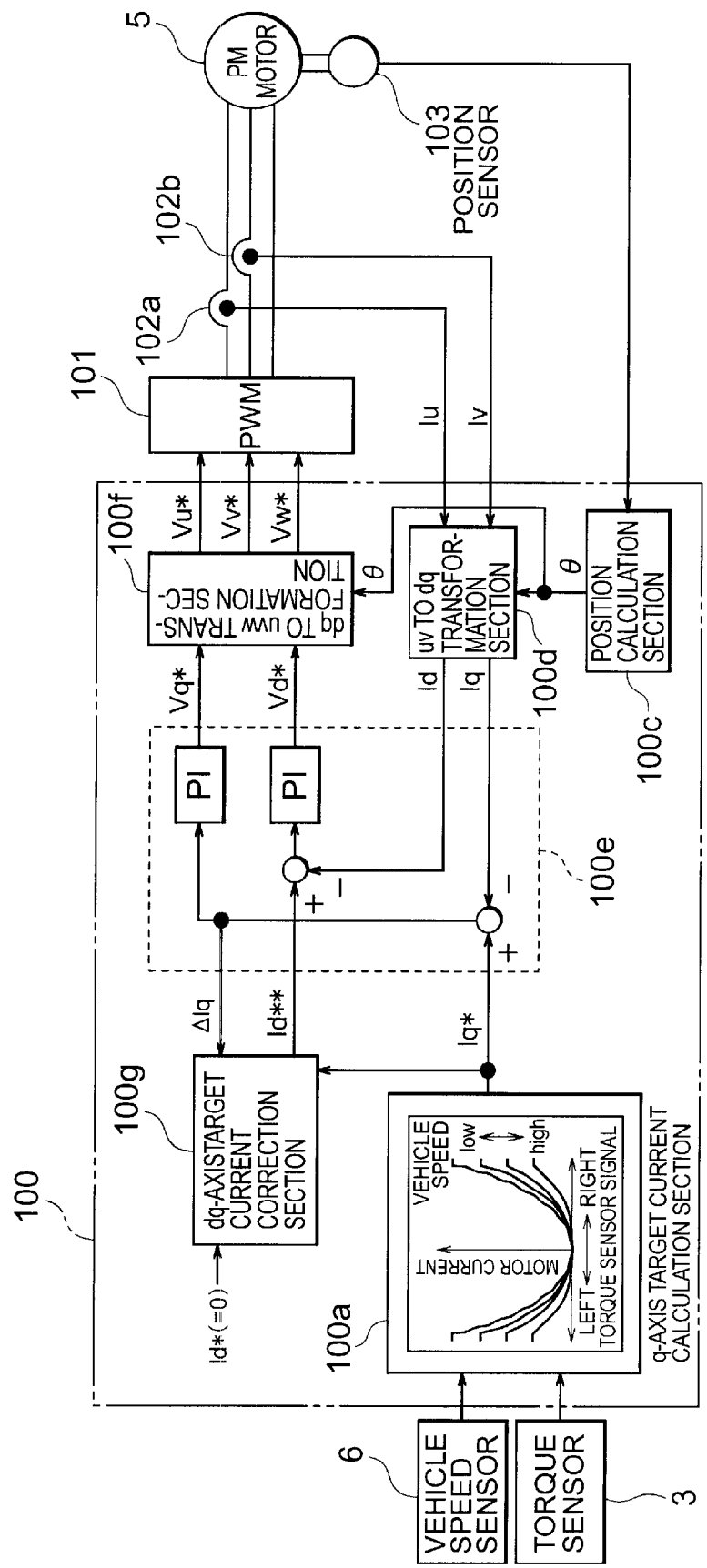
FIG. 7 is a block diagram illustrating functions of a third embodiment of the present invention.

FIG. 7 functionally illustrates an example of an electric power steering control apparatus according to the third embodiment of the present invention in which a PM brushless motor is used as a steering assisting motor. In FIG. 7, the same or corresponding parts as those in FIG. 2 are identified by the same symbols while omitting a detailed description thereof.

Figure 8:
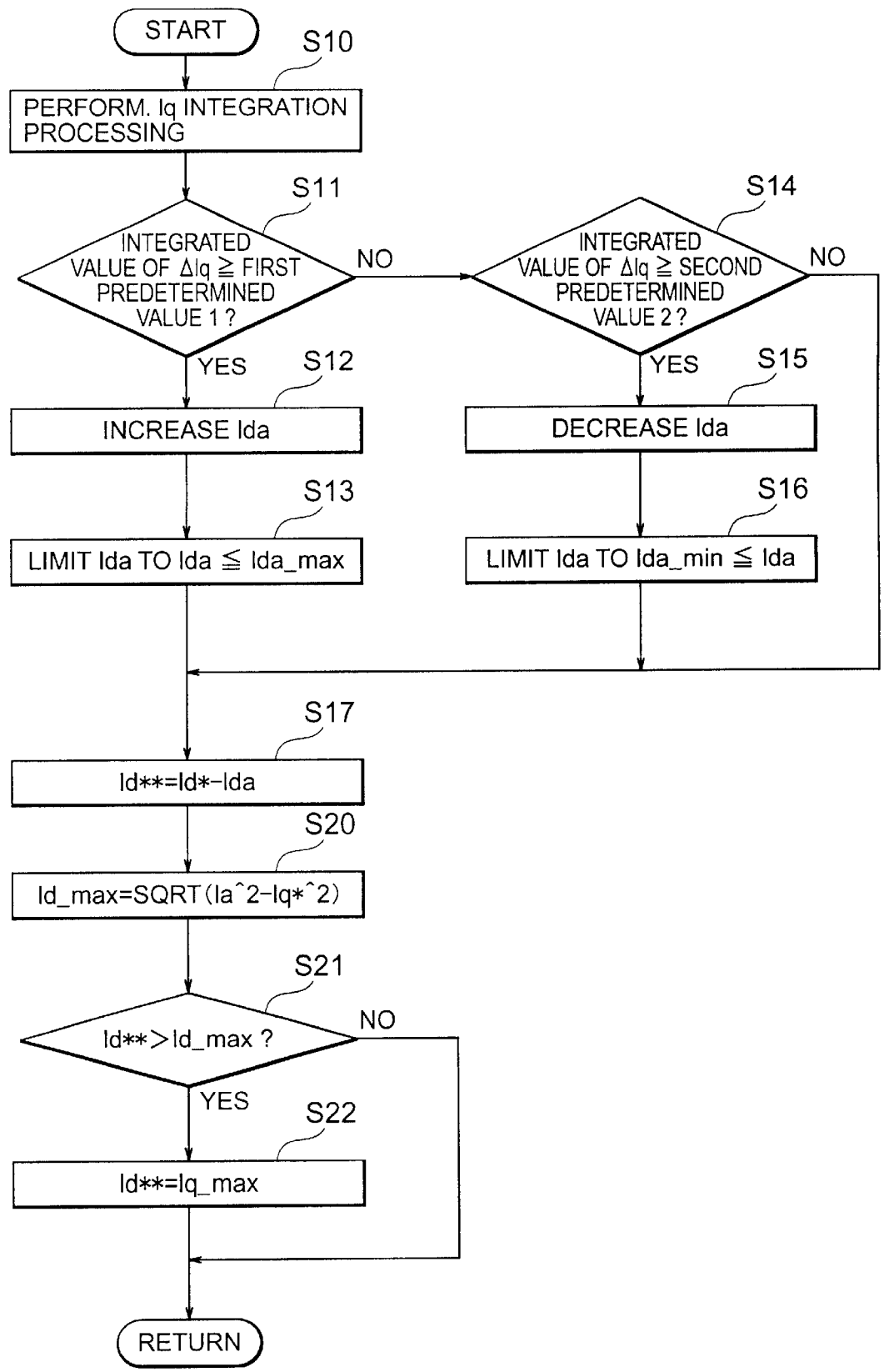
FIG. 8 is a flow chart illustrating d-axis target current correction processing in the third embodiment of the present invention.

FIG. 8 is a flow chart for explaining the processing performed by a dq-axis target current correction section 100g.

In step S10, the q-axis current deviation ΔIq is integrated, and in step S11, it is determined whether the integrated value of ΔIq is not less than the first predetermined value 1. When the integrated value of ΔIq is not less than the first predetermined value 1, a d-axis current correction amount Ida is increased in step S12, and the correction value is limited to a preset maximum correction value Ida_max in step S13. On the other hand, when the integrated value of ΔIq is less than the first predetermined value 1, it is further determined whether the integrated value of ΔIq is not greater than a second predetermined value 2 in step S14. When the integrated value of ΔIq is not greater than the second predetermined value 2, the d-axis current correction amount Ida is decreased in step S15, and the correction value is limited to a preset minimum correction value Ida_min in step S16. Then in step S17, a corrected d-axis target current value (Id**) is calculated by subtracting the d-axis current correction value (Ida) from the d-axis target current (Id*).

Subsequently, in step S20, a maximum d-axis target current (Id_max) is calculated by subtracting the q-axis target current value (Iq*) from a preset maximum current vector value (Ia). In step S21, it is determined whether the corrected d-axis target current value (Id) is greater than the maximum d-axis target current (Id_max). When the corrected d-axis target current value (Id) is greater than the maximum d-axis target current (Id_max), the maximum d-axis target current (Id_max) is adopted as the corrected d-axis target current value (Id**) in step S22.

Embodiment 4

In a fourth embodiment of the present invention, when the steering torque exceeds a prescribed torque value, the d-axis target current is corrected in such a manner as to decrease the magnetic field of the motor field magnet, whereby the magnetic field is weakened upon high-speed steering in which the steering assisting torque is reduced due to voltage saturation, thus alleviating an increase in the steering torque during such high-speed steering.

Figure 9:
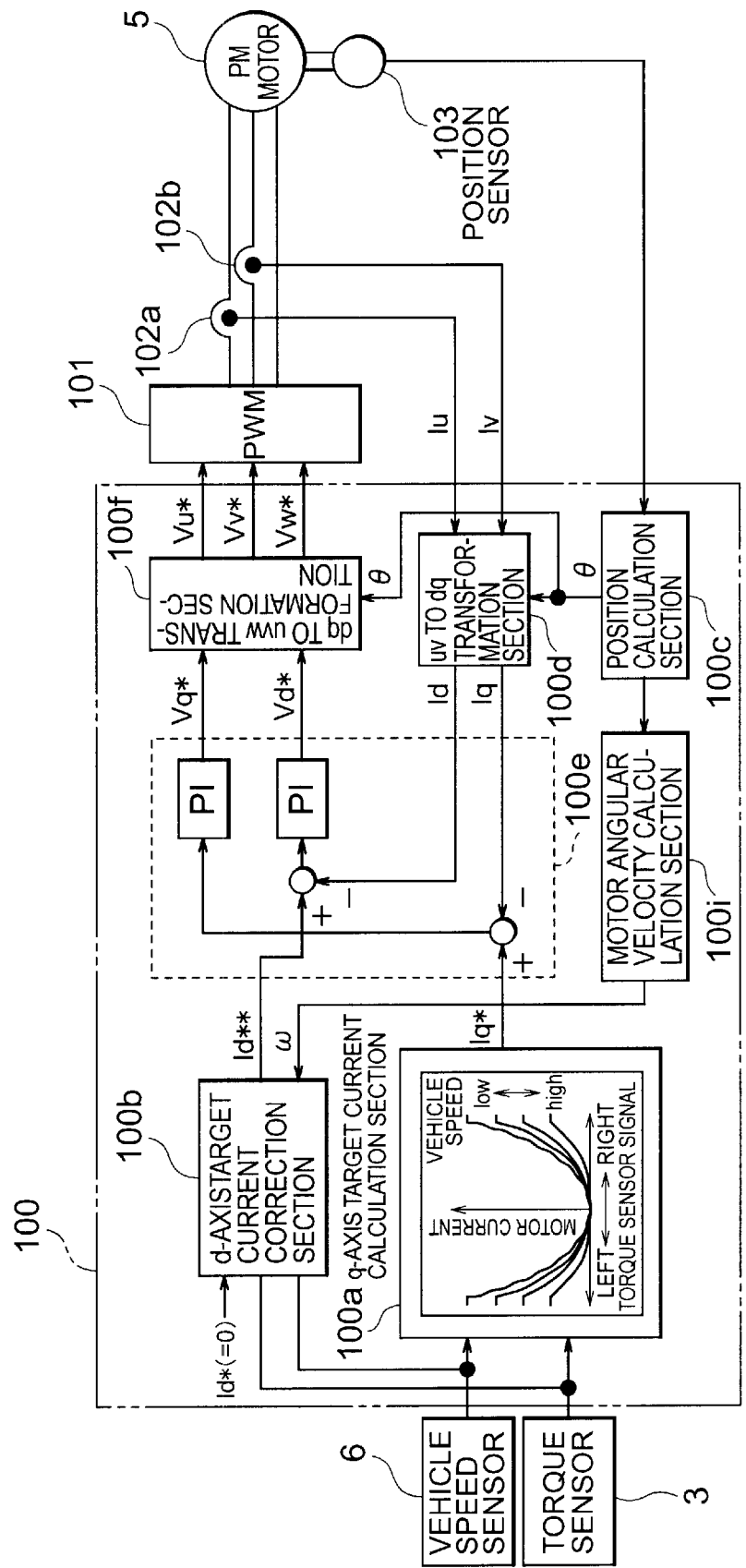
FIG. 9 is a block diagram illustrating functions of a fourth embodiment of the present invention.

FIG. 9 functionally illustrates an example of an electric power steering control apparatus according to the fourth embodiment of the present invention in which a PM brushless motor is used as a steering assisting motor. In FIG. 9, the same or corresponding parts as those in FIG. 2 are identified by the same symbols while omitting a detailed description thereof.

In FIG. 9, a motor angular velocity calculation section 100i determines a motor rotational angular velocity ω through calculations based on the electrical angle θ from the position calculation section 100c, and supplies it to the d-axis target current correction section 100b.

Figure 10:
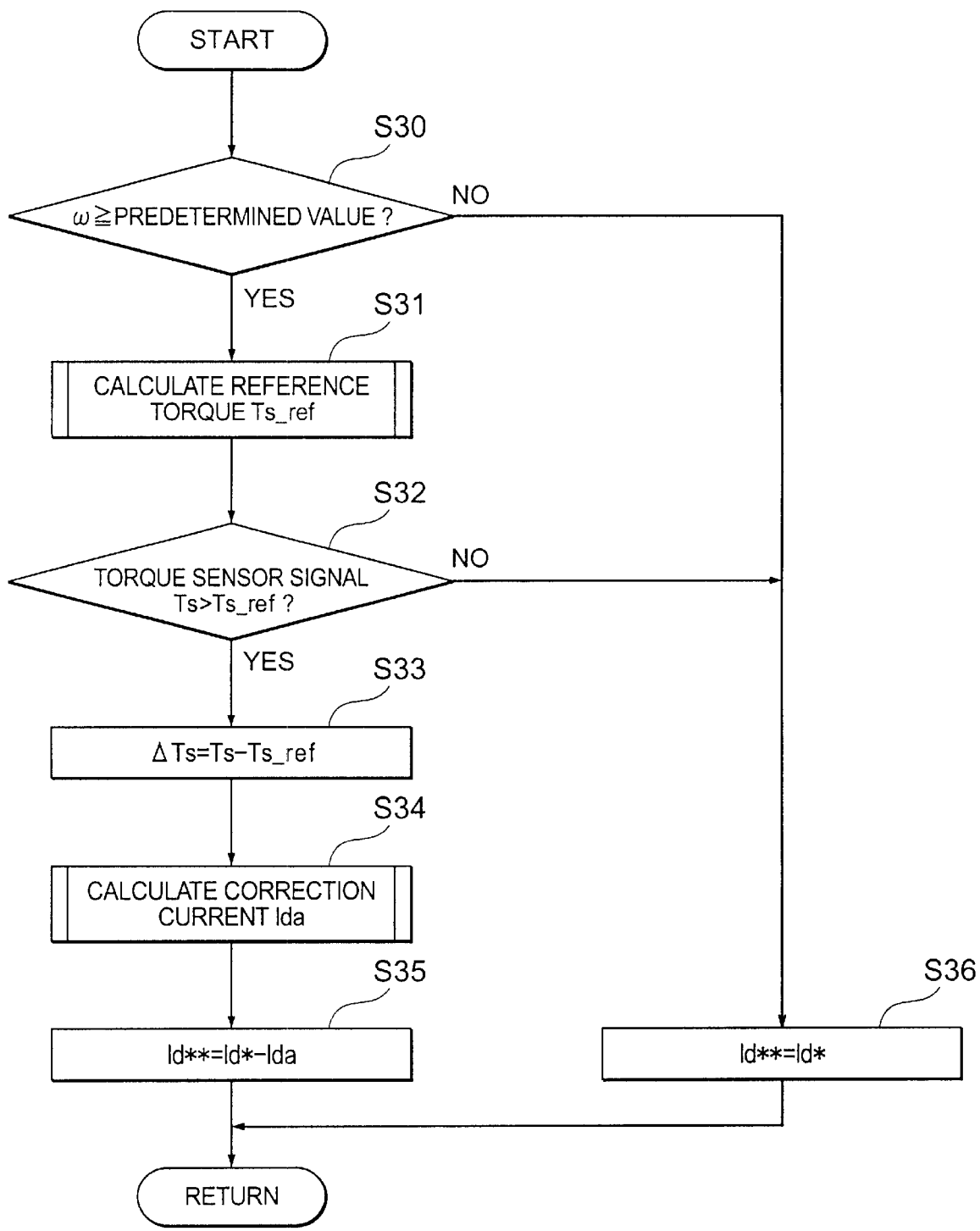
FIG. 10 is a flow chart illustrating d-axis target current correction processing in the fourth embodiment of the present invention.

FIG. 10 is a flow chart for explaining the processing performed by the d-axis target current correction section 100b in the electric power steering control apparatus according to the fourth embodiment of the present invention.

In step S30, it is determined whether the motor angular velocity ω is not less than a predetermined value, and when the motor angular velocity ω is less than the predetermined value, the d-axis target current (Id*) is adopted as the corrected d-axis target current (Id**) in step S36, whereas when the motor angular velocity ω is not less than the predetermined value, the control process advances to reference torque Ts_ref calculation processing in step 31. In the reference torque Ts_ref calculation processing in step S31 (i.e., a reference steering torque generation section), a reference torque Ts_ref is determined by referring to a table, which has been prepared in advance as a function of the vehicle speed detected by the vehicle speed sensor 6 or by the use of the detected vehicle speed as a parameter, alternatively it is determined as a preset constant value instead of referring to such a table. In step S32, a comparison is made between the torque sensor signal (Ts) and the reference torque (Ts_ref), and when the torque sensor signal (Ts) is not greater than the reference torque (Ts_ref), the d-axis target current (Id*) is adopted as the corrected d-axis target current (Id**) in step S36, whereas when the torque sensor signal (Ts) is greater than the reference torque (Ts_ref), the control process advances to the processing in step S33.

In step S33, a difference ΔTs between the torque sensor signal (Ts) and the reference torque (Ts_ref) is calculated by subtracting the reference torque (Ts_ref) from the torque sensor signal (Ts). Then in the correction current Ida calculation processing in step S34, a correction current Ida is calculated by referring to a table, which has been prepared in advance as a function of ΔTs or using ΔTs as a parameter. In step S35, a corrected d-axis target current (Id**) is calculated by subtracting the correction current (Ida) from the d-axis target current (Id*), and the thus corrected d-axis target current (Id**) is supplied to the current control section 100e.

Embodiment 5

In a fifth embodiment of the present invention, when the motor rotational speed exceeds a predetermined value, the current instruction value for controlling the magnetic field of the motor field magnet is corrected to such a prescribed value as to decrease the magnetic field, whereby the magnetic field is weakened upon high-speed steering, thus alleviating an increase in the steering torque during such high-speed steering.

Figure 11:
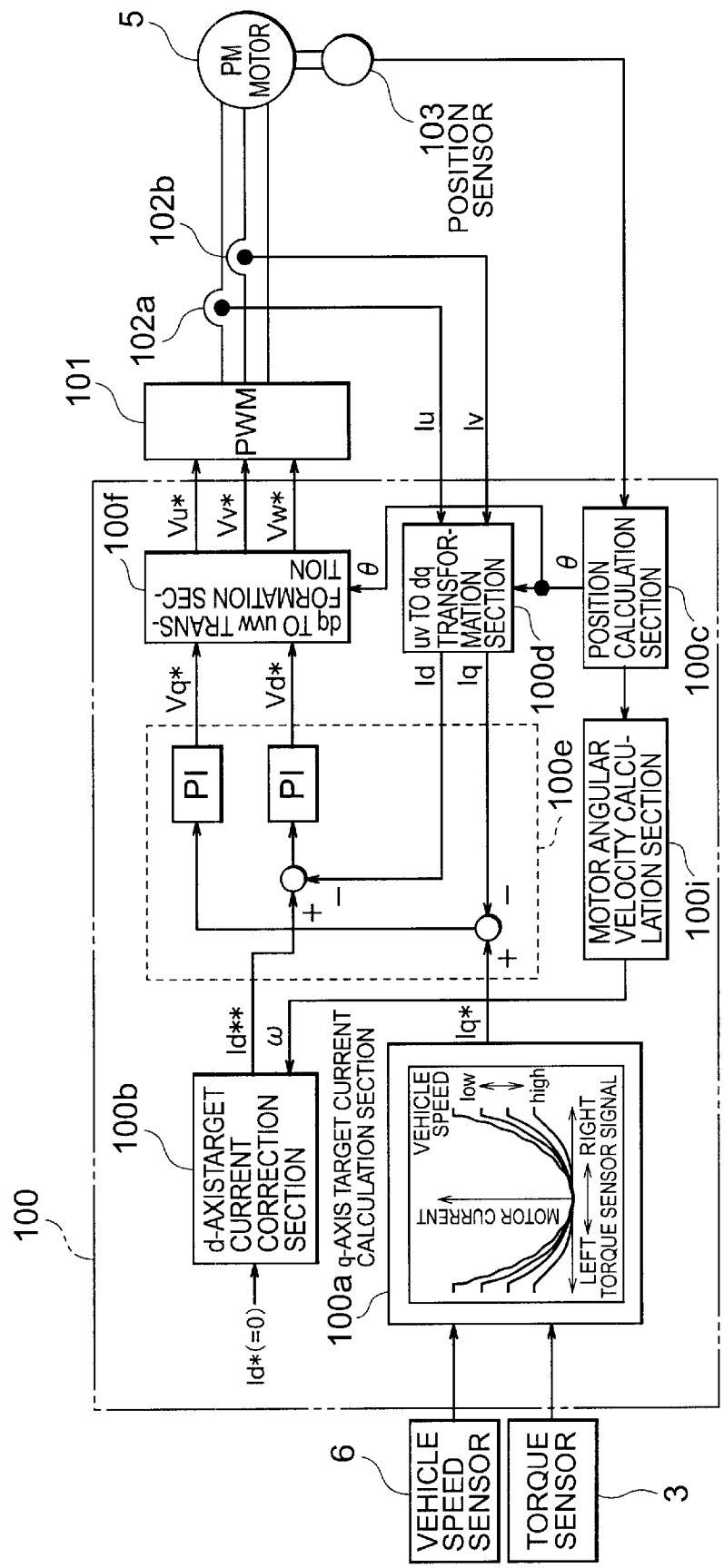
FIG. 11 is a block diagram illustrating functions of a fifth embodiment of the present invention.

FIG. 11 functionally illustrates an example of an electric power steering control apparatus according to the fifth embodiment of the present invention in which a PM brushless motor is used as a steering assisting motor. In FIG. 11, the same or corresponding parts as those in FIGS. 2 and 9 are identified by the same symbols while omitting a detailed description thereof.

Figure 12:
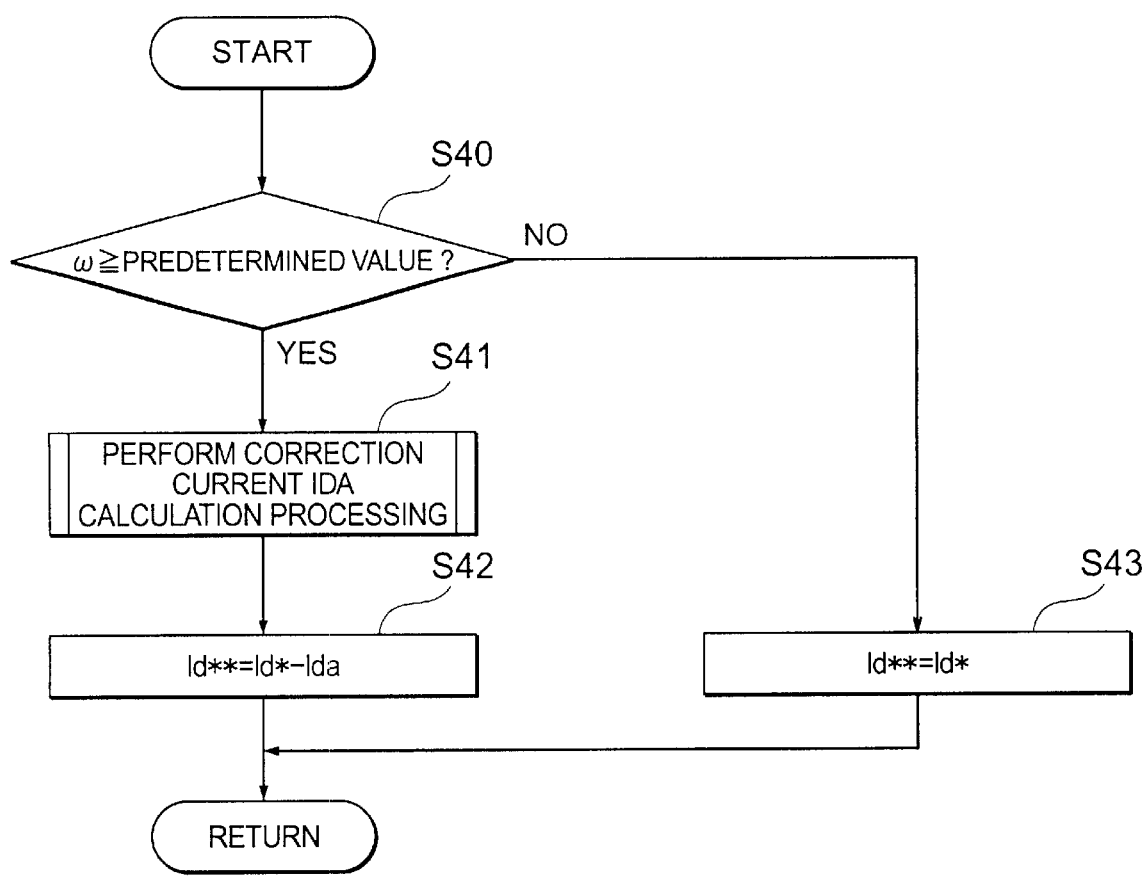
FIG. 12 is a flow chart illustrating d-axis target current correction processing in the fifth embodiment of the present invention.

FIG. 12 is a flow chart for explaining the processing performed by the d-axis target current correction section 100b.

In step S40, it is determined whether the motor angular velocity ω is not less than a predetermined value, and when the motor angular velocity ω is less than the predetermined value, the d-axis target current (Id*) is adopted as the corrected d-axis target current (Id) in step S43, whereas when the motor angular velocity ω is not less than the predetermined value, the control process advances to correction current Ida calculation processing in step 41. In the correction current Ida calculation processing in step S41, a correction current Ida is calculated by referring to a table, which has been prepared in advance as a function of the motor angular velocity ω or using the motor angular velocity ω as a parameter. In step S42, a corrected d-axis target current (Id) is calculated by subtracting the correction current (Ida) from the d-axis target current (Id*), and the thus corrected d-axis target current (Id**) is supplied to the current control section 100e.

Embodiment 6

In a sixth embodiment of the present invention, when the steering speed exceeds a predetermined value, the current instruction value for controlling the magnetic field of the motor field magnet is corrected to such a prescribed value as to decrease the magnetic field, whereby the magnetic field is weakened upon high-speed steering, thus alleviating an increase in the steering torque during such high-speed steering.

Figure 13:
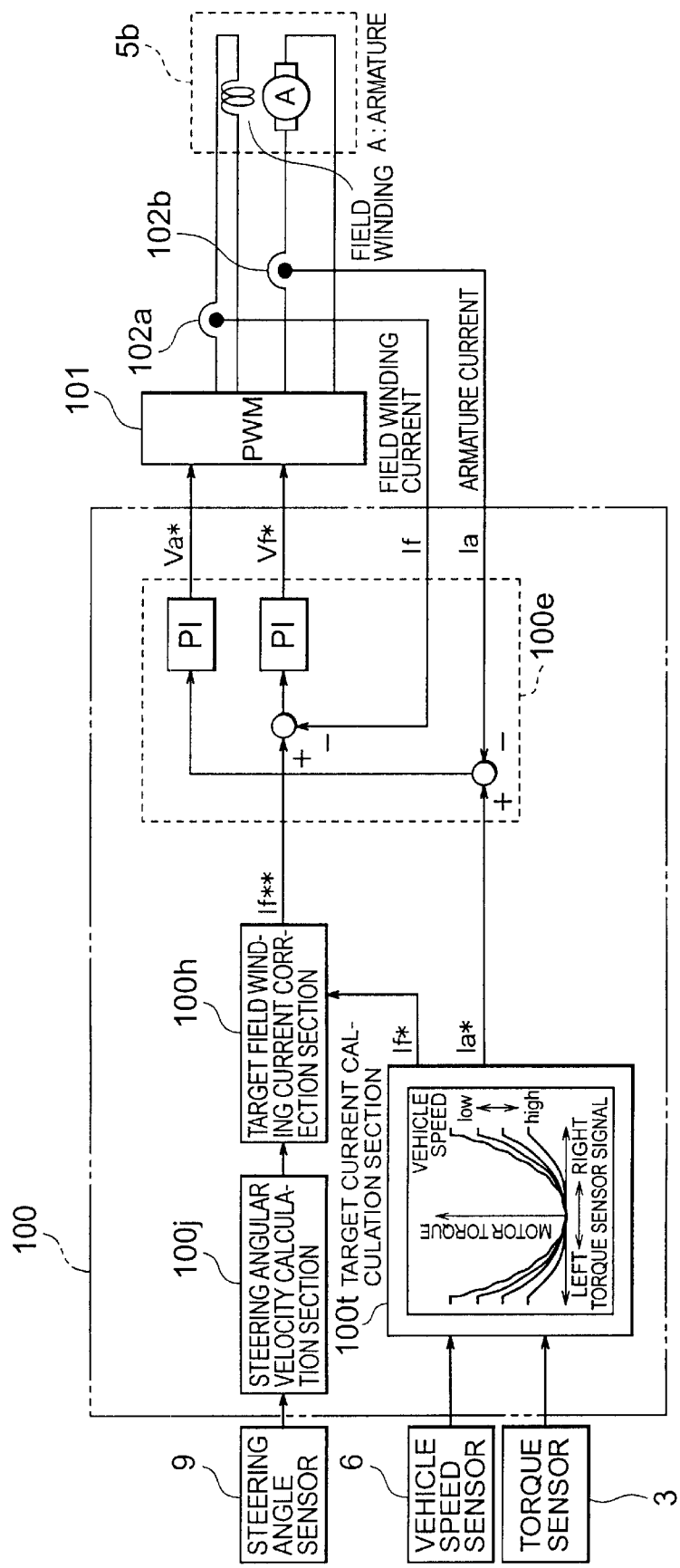
FIG. 13 is a block diagram illustrating functions of a sixth embodiment of the present invention.

FIG. 13 functionally illustrates an example of an electric power steering control apparatus according to the sixth embodiment of the present invention in which a field winding type motor is used as a steering assisting motor. In FIG. 13, the same or corresponding parts as those in FIG. 2 are identified by the same symbols while omitting a detailed description thereof.

In FIG. 13, the electric power steering control apparatus of this sixth embodiment includes a steering angle sensor 9, a steering angular velocity calculation section 100j acting as a steering speed detection section for determining a steering angular velocity ω' based on the output of the steering angle sensor 9, and a target current calculation section 100t for determining a target armature current value (Ia*) and a target field winding current value (If*) to drive a field winding type motor 5b based on the torque detection signal of the torque sensor 3, which detects the steering torque, and the vehicle speed detection signal of the vehicle speed sensor 6, which detects the vehicle speed. The target current calculation section 100t supplies the thus determined target armature current value (Ia*) to the current control section 100c, and the thus determined target field winding current value (If*) to a target field winding current correction section 100h to be described later.

Figure 14:
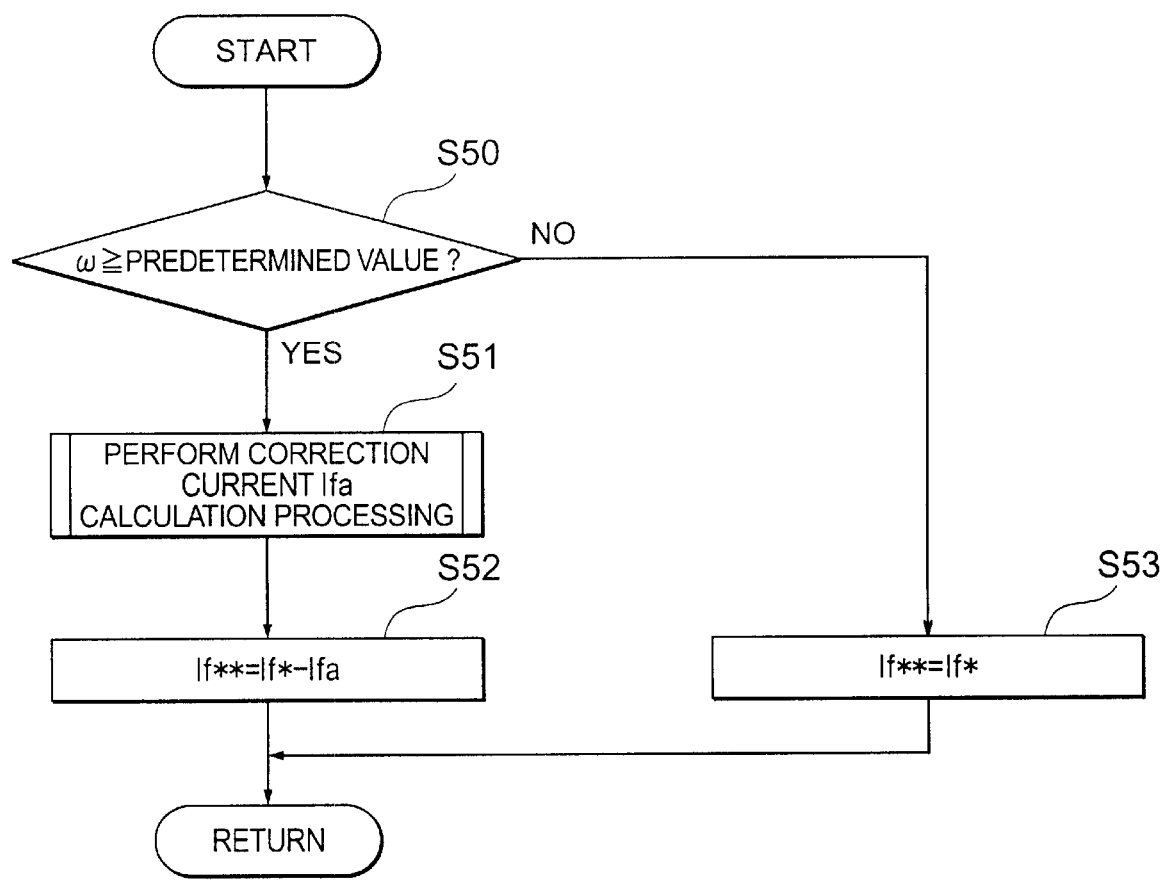
FIG. 14 is a flow chart illustrating d-axis target current correction processing in the sixth embodiment of the present invention.

FIG. 14 is a flow chart for explaining the processing performed by the target field winding current correction section 100h.

In step S50, it is determined whether the steering angular velocity ω' is not less than a predetermined value, and when the steering angular velocity ω' is less than the predetermined value, the target field winding current (If*) is adopted as the corrected target field winding current (If) in step S53, whereas when the steering angular velocity ω' is not less than the predetermined value, the control process advances to correction current Ifa calculation processing in step 51. In the correction current Ifa calculation processing in step S51, a correction current Ifa is calculated by referring to a table, which has been prepared in advance as a function of the steering angular velocity ω' or using the steering angular velocity ω' as a parameter. In step S52, the corrected target field winding current (If) is determined by subtracting the correction current (Ifa) from the target field winding current (If*), and the corrected target field winding current (If**) thus determined is supplied to the current control section 100e.

Embodiment 7

In a seventh embodiment of the present invention, a d-axis current value (Ida) for setting a working point on a voltage limiting circle is determined through calculations based on a motor rotational speed detection value, a q-axis current instruction value, a stator winding resistance, a stator winding reactance and a motor counter electromotive voltage constant, and when the d-axis current value (Ida) thus calculated is such a current value as to weaken the magnetic field of the motor field magnet more than the d-axis current instruction value (Id*) does, the d-axis current instruction value is corrected in such a manner that the d-axis current value (Ida) calculated above becomes equal to the d-axis current instruction value, thereby weakening the magnetic field upon high-speed steering to alleviate an increase in the steering torque during such high-speed steering.

Figure 15:
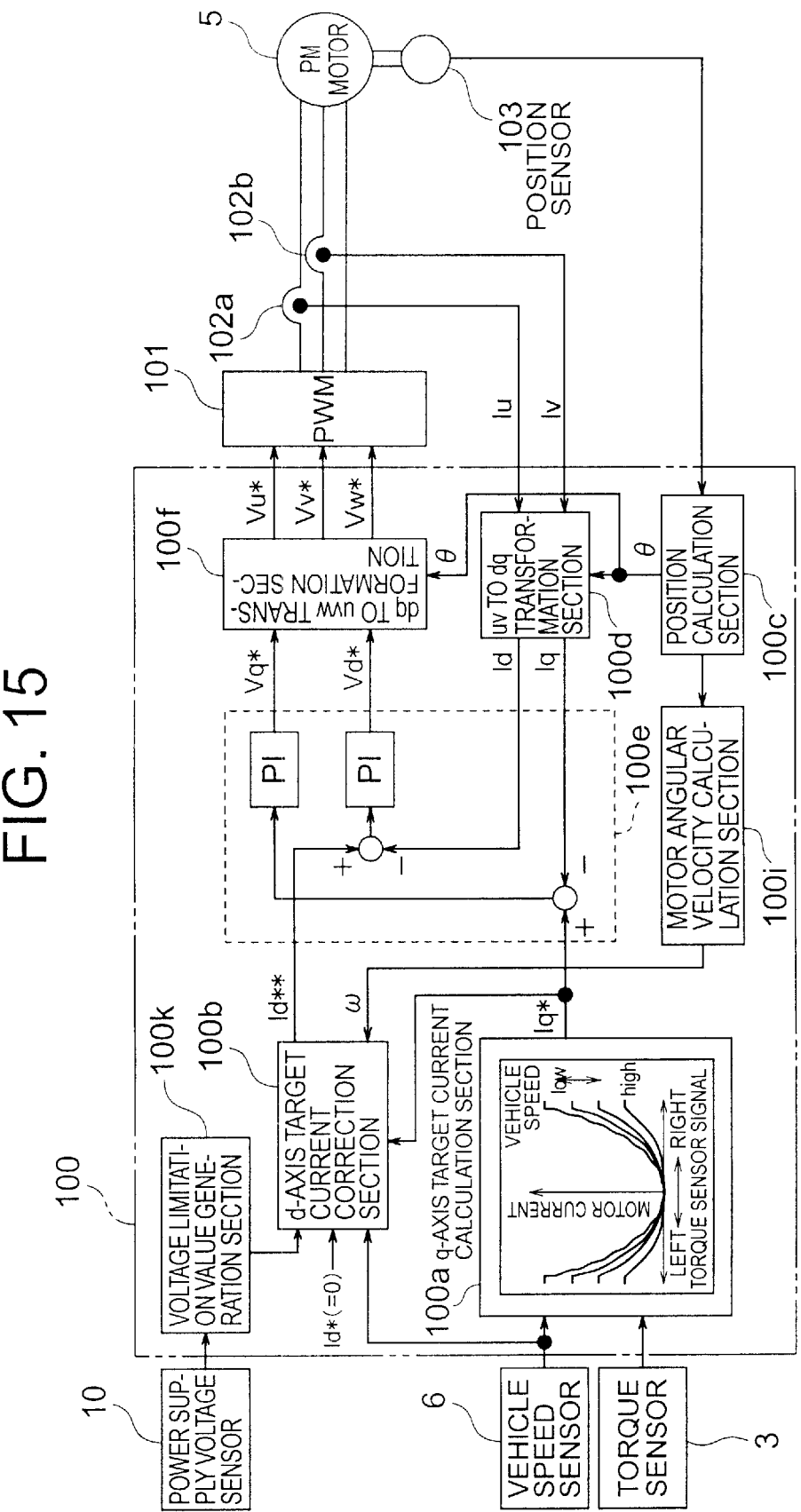
FIG. 15 is a block diagram illustrating functions of a seventh embodiment of the present invention.

FIG. 15 functionally illustrates an example of an electric power steering control apparatus according to the seventh embodiment of the present invention in which a PM brushless motor is used as a steering assisting motor. In FIG. 15, the same or corresponding parts as those in FIG. 2 are identified by the same symbols while omitting a detailed description thereof.

The electric power steering control apparatus according to this seventh embodiment of the present invention substantially includes, in addition to the components of the aforementioned first embodiment, a power supply voltage sensor 10 acting as a power supply voltage detection section, a voltage limitation value generation section 100k, and a motor angular velocity calculation section 100i. The voltage limitation value generation section 100k generates a voltage limitation value (V_lim) by multiplying the voltage detected by the power supply voltage sensor 10 by a predetermined coefficient, and supplies it to the d-axis target current correction section 100b.

Here, a brief description of the magnetic field weakening control will be made using the following expression (1) and FIG. 16.

A fundamental equation (under-mentioned expression (1)) for the PM brushless motor 5 is well-known as shown below.

$$V^2 = (\phi\omega + Ri_q - \omega L_d i_d)^2 + (Ri_d + \omega L_q i_q)^2 \quad (1)$$

where V represents a terminal voltage supplied to the motor; ω represents the angular velocity of the motor; R represents a stator winding resistance per phase; φ represents an unloaded induced voltage at a unit speed; $L_d$ and $L_q$ represent phase inductances for the d-axis and the q-axis, respectively; Id represents a d-axis current; and Iq represents a q-axis current.

FIGS. 16A through 16D are vector diagrams illustrating d-q rotating coordinate axes.

As the rotational speed ω of the PM brushless motor 5 increases, the voltage induced therein grows. When the voltage value V, which is a vector sum of the induced voltage ωφ, $Ri_q$ and $\omega L_d i_d$, reaches the voltage limitation circle as illustrated in FIG. 16A, it becomes impossible for the PM brushless motor 5 to increase its rotational speed to a value equal to or higher than the rotational speed ω which is acquired by the motor 5 when the voltage value V has reached the voltage limitation circle.

However, with the electric power steering control apparatus, the rotational speed ω of the PM brushless motor 5 follows the steering speed of the steering wheel, so that the PM brushless motor 5 is forced to rotate at a speed higher than its own rotational speed performance at the time of high-speed steering of the steering wheel.

At this time, $Ri_q$ decreases due to an increase in the induced voltage ωφ under the restraint of the voltage value V, as illustrated in FIG. 16B. As a result, the output torque of the PM brushless motor 5 is decreased, whereby the steering assisting torque is reduced, thus increasing the steering torque.

Here, by supplying the d-axis current for weakening the magnetic field of the motor field magnet, there is developed a voltage margin due to Rid and $\omega L_d i_d$, as illustrated in FIG. 16C.

Consequently, it becomes possible to cause the same amount of q-axis current as in FIG. 16A to flow at the same rotational speed as in FIG. 16B, as illustrated in FIG. 16D.

As described above, a decrease in the output torque of the motor at high-speed rotation thereof can be alleviated by performing magnetic field weakening control, so that an increase in the steering torque during high-speed steering can be reduced.

Figure 17:
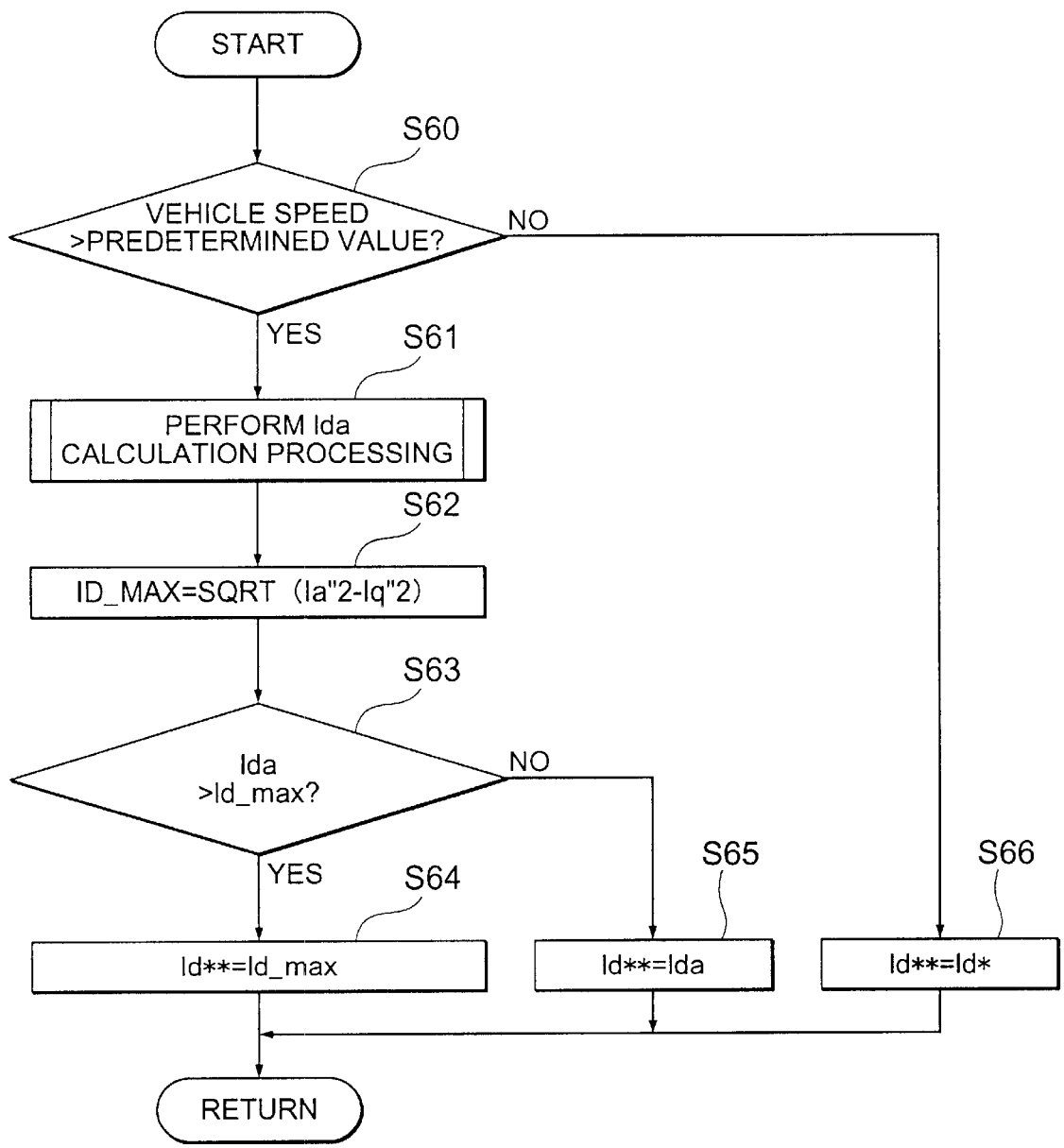
FIG. 17 is a flow chart illustrating d-axis target current correction processing in the seventh embodiment of the present invention.

FIG. 17 is a flow chart for explaining the processing performed by the d-axis target current correction section 100b.

In step S60, it is determined whether the vehicle speed is not less than a predetermined value, and when the vehicle speed is less than the predetermined value, the d-axis target current (Id*) is adopted as the corrected d-axis target current (Id) in step S66, whereas when the vehicle speed is not less than the predetermined value, the control process advances to Ida calculation processing in step S61. In the Ida calculation processing in step S61, a d-axis current instruction value (Ida) for setting a working point on the voltage limitation circle is calculated according to a predetermined calculation formula based on the detected motor rotational speed ω, the voltage limitation value (V_lim), the q-axis current instruction value, the stator winding resistance given in advance, the stator reactance given in advance, and the motor counter electromotive voltage constant given in advance. In step S62**, a maximum d-axis target current (Id_max) is calculated by subtracting a q-axis detection current value (Iq) from a preset maximum current vector value (Ia).

In step S63, it is determined whether the d-axis current instruction value (Ida) calculated in step S61 for setting a working point on the voltage limitation circle is greater than the maximum d-axis target current (Id_max). When the d-axis current instruction value (Ida) is greater than the maximum d-axis target current (Id_max), the maximum d-axis target current (Id_max) is adopted as the corrected d-axis target current value (Id) in step S64. On the other hand, when the d-axis current instruction value (Ida) is less than the maximum d-axis target current (Id_max), the d-axis current instruction value (Ida) is adopted as the corrected d-axis target current value (Id). The corrected d-axis target current (Id) calculated according to the above-mentioned steps is supplied to the current control section 100e**.

Embodiment 8

Figure 18:
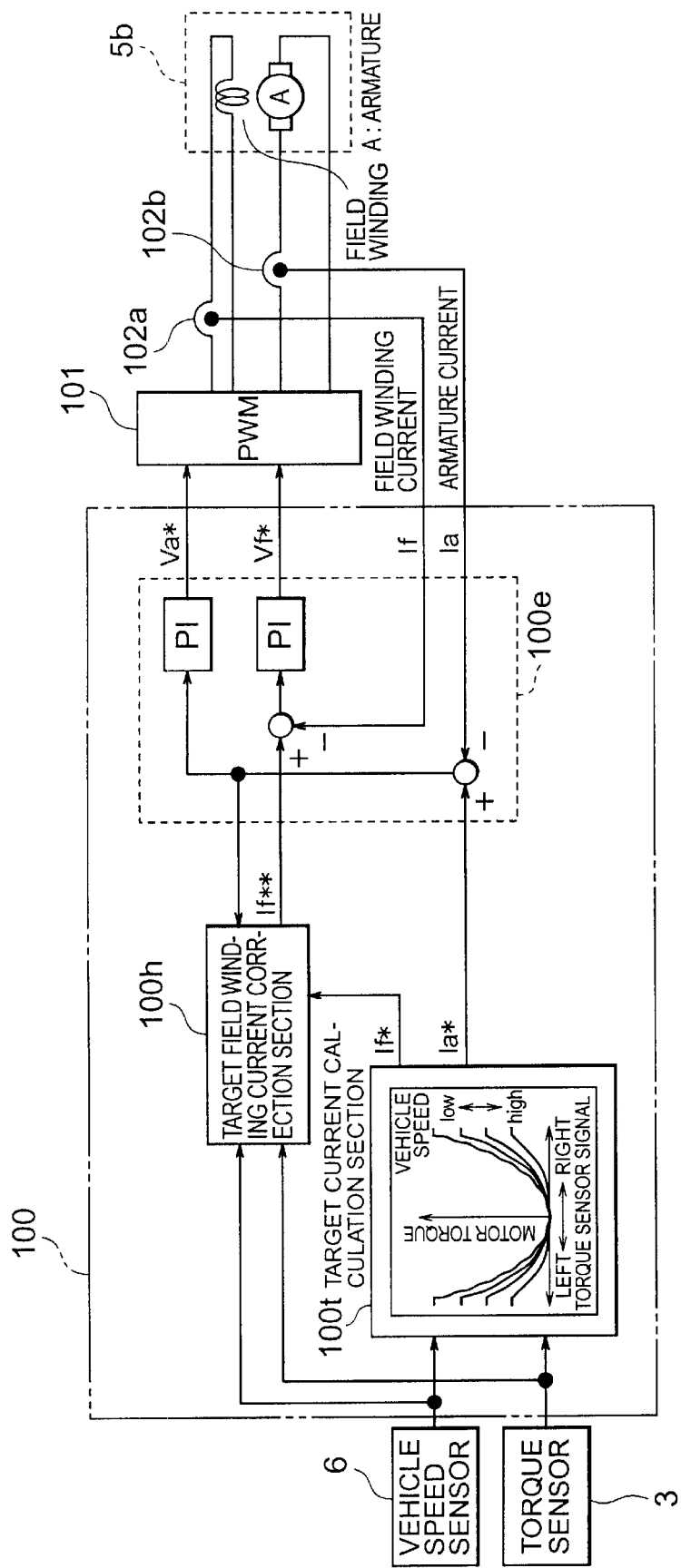
FIG. 18 is a block diagram illustrating an eighth embodiment of the present invention.

In an eighth embodiment of the present invention, the field winding current instruction value is corrected as a function of an armature current deviation (ΔIa), whereby the magnetic field of the motor field magnet is weakened upon high-speed steering in which the armature current deviation is increased due to voltage saturation, thus alleviating an increase in the steering torque during such high-speed steering. FIG. 18 functionally illustrates an example of an electric power steering control apparatus according to the eighth embodiment of the present invention in which a field winding type motor is used as a steering assisting motor. In FIG. 18, the same or corresponding parts as those in FIGS. 2 and 13 are identified by the same symbols while omitting a detailed description thereof.

Figure 19:
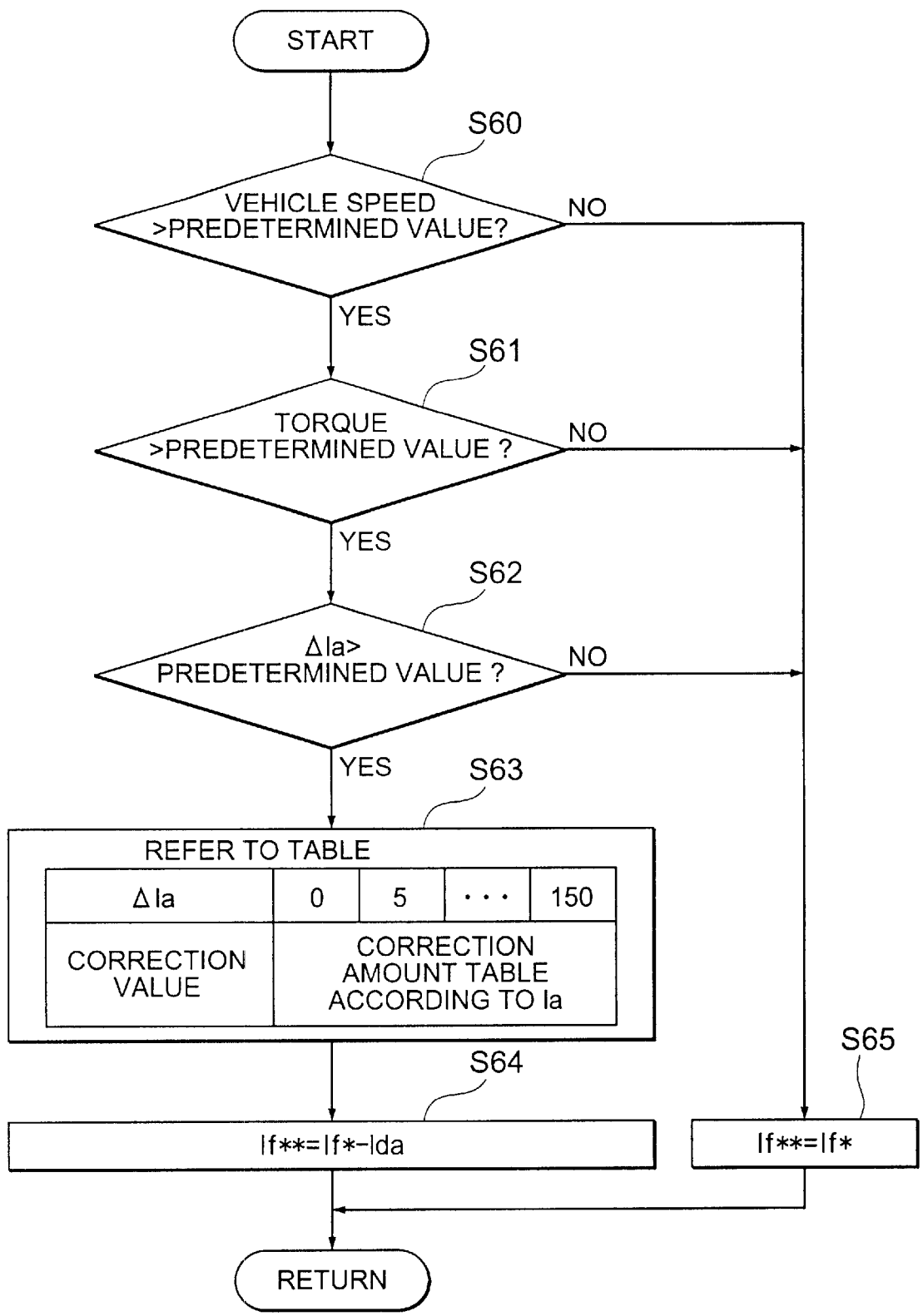
FIG. 19 is a flow chart illustrating field current instruction value correction processing in the eighth embodiment of the present invention.

FIG. 19 is a flow chart for explaining the processing performed by the target field winding current correction section 100h in the electric power steering control apparatus according to the eighth embodiment of the present invention.

In step S60, it is determined whether the vehicle speed detected by the vehicle speed sensor 6 is greater than a predetermined value, and when the vehicle speed is less than the predetermined value, the field current instruction value (If*) is adopted as the corrected field current instruction value (If) in step S65, whereas when the vehicle speed is greater than the predetermined value, the control process advances to the processing in step 61. Subsequently, in step S61, it is determined whether the steering torque detected by the torque sensor 3** is greater than a predetermined value, and when the steering torque is less than the predetermined value, the field current instruction value (If*) is adopted as the corrected field current instruction value (If) in step S65, whereas when the steering torque is greater than the predetermined value, the control process advances to the processing in step S62**.

In step S62, it is determined whether the armature current deviation (ΔIa) is greater than a predetermined value, and when the armature current deviation (ΔIa) is less than the predetermined value, the field current instruction value (If*) is adopted as the corrected field current instruction value (If) in step S65, whereas when the armature current deviation (ΔIa) is greater than the predetermined value, the control process advances to the processing in step 63. In step 63, a corrected current value (Ida) is determined by referring to a table, which has been prepared in advance using the armature current deviation (ΔIa) as a parameter. Then in step S64**, the field current instruction value is corrected by subtracting the corrected current value (Ida) from the field current instruction value (If*), and the thus corrected field current instruction value (If) is supplied to the current control section 100e**.

As described in the foregoing, according to the present invention, current is controlled in such a manner that the magnetic field of the motor field magnet is weakened during high-speed steering in which the output torque of the motor decreases. As a result, a decrease in the motor output torque can be alleviated.

Figure 20:
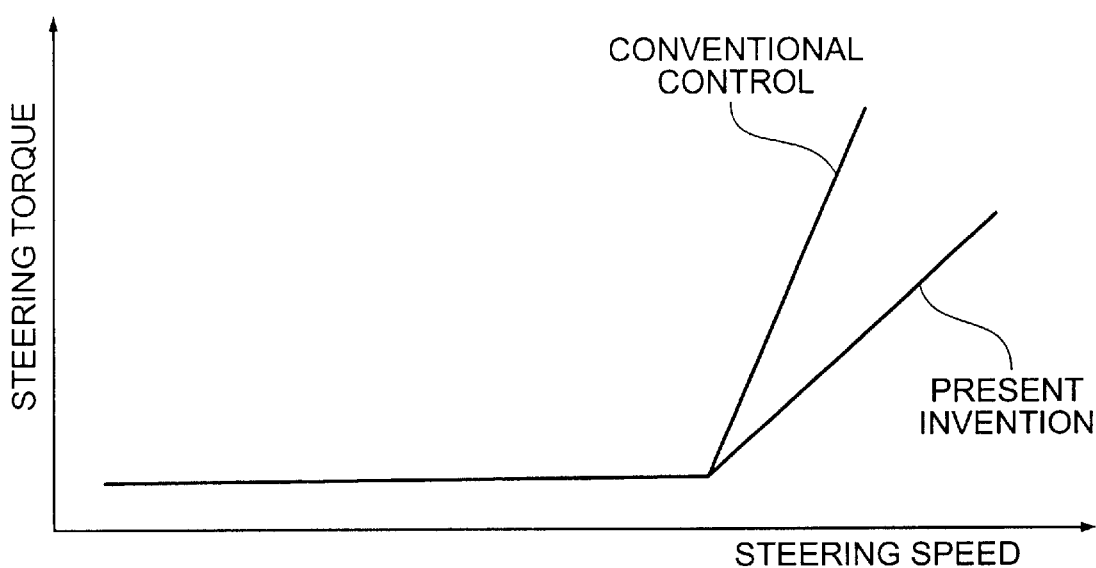
FIG. 20 is a steering speed vs. steering torque characteristic view illustrating effects of the present invention.

Moreover, in the case of an electric power steering control apparatus, an increase in the steering torque at the time of high-speed steering can be reduced, as illustrated in FIG. 20 for instance.

In addition, in the case of a steer-by-wire steering system, it is possible to improve the followability of an actual steering angle with respect to an operator's induced steering angle at the time of high-speed steering.

While the invention has been described in terms of preferred embodiments, those skilled in the art will recognize that the invention can be practiced with modifications within the spirit and scope of the appended claims.

What is claimed is:

1. A steering control apparatus including a motor, a motor current instruction value generation section for generating a current instruction value for said motor, and a motor current detection section for detecting a current flowing through said motor, said motor being driven to operate based on at least the current flowing through said motor and said current instruction value,
wherein said motor current instruction value generation section includes a correction section for correcting a current instruction value which controls a magnetic field of a field magnet of said motor, said correction section being operable to correct said current instruction value for controlling the magnetic field of said motor field magnet when a steering speed is high.

2. The steering control apparatus according to claim 1, further comprising a motor control section for performing torque control on said motor in accordance with a torque instruction through vector control which is represented by a two-phase rotating magnetic flux coordinate system having a direction of a field current oriented in a d-axis direction and a direction perpendicular to the d-axis oriented in a q-axis direction, wherein said correction section corrects a d-axis current instruction value in such a manner that a d-axis current is controlled to such a predetermined value as to weaken the magnetic field of said motor field magnet when a deviation between the q-axis current instruction value and a q-axis current detection value becomes not less than a predetermined value.

3. The steering control apparatus according to claim 2, wherein said correction section increases a negative d-axis current instruction value for weakening the magnetic field of said motor field magnet when said q-axis current deviation is not less than a first predetermined value, and decreases the negative d-axis current instruction value for weakening the magnetic field of said motor field magnet when said q-axis current deviation is not greater than a second predetermined value.

4. The steering control apparatus according to claim 3, wherein said d-axis current instruction value is limited within a preset range.

5. The steering control apparatus according to claim 2, further comprising a stator phase current instruction value generation section for generating stator respective phase current instruction values from said q-axis current instruction value, wherein said current instruction value for controlling the magnetic field of said motor field magnet is corrected based on a deviation between at least one of said stator phase current instruction values and an actual corresponding stator phase current value in place of said q-axis current deviation.

6. The steering control apparatus according to claim 1, further comprising a reference steering torque generation section for generating a reference steering torque which is used to determine whether the magnetic field of said motor field magnet is to be weakened, wherein when the steering torque becomes not less than said reference steering torque, said correction section corrects said current instruction value to such a prescribed value as to weaken the magnetic field of said motor field magnet.

7. The steering control apparatus according to claim 6, wherein said reference steering torque generation section generates said reference steering torque as a function of at least a vehicle speed.

8. The steering control apparatus according to claim 1, further comprising a steering speed detection section for detecting a steering speed of a steering wheel, wherein said correction of the current instruction value for controlling the magnetic field of said motor field magnet is effected such that when the steering speed of said steering wheel becomes not less than a predetermined value, said current instruction value is corrected to such a prescribed value as to weaken the magnetic field of said motor field magnet.

9. The steering control apparatus according to claim 1, further comprising: a motor control section for performing torque control on said motor in accordance with a torque instruction through vector control which is represented by a two-phase rotating magnetic flux coordinate system having a direction of a field current oriented in a d-axis direction and a direction perpendicular to the d-axis direction oriented in a q-axis direction; a speed detection section for detecting a rotational speed of said motor; and a voltage limitation value generation section for generating a voltage limitation value to a voltage applied to said motor; wherein said correction section determines a d-axis current value for setting a working point on a voltage limitation circle through calculations based on at least the rotational speed of said motor, a q-axis current instruction value, a stator winding resistance, a stator winding reactance and a motor counter electromotive voltage constant, and effects correction in such a manner that when said d-axis current value determined through calculations is a current value which weakens the magnetic field of said motor field magnet more than a d-axis current instruction value does, said d-axis current value determined through calculations becomes equal to said d-axis current instruction value.

10. The steering control apparatus according to claim 9, further comprising a power supply voltage detection section for detecting a power supply voltage, wherein said voltage limitation value generation section generates, as a voltage limitation value, a value obtained by multiplying said power supply voltage by a predetermined coefficient.

11. The steering control apparatus according to claim 1, wherein said motor comprises a field winding type motor, and said apparatus further comprises a motor control section for performing torque control on said motor in accordance with a torque instruction in such a manner that a field winding current instruction value is corrected when a deviation between an armature current instruction value and an armature current detection value becomes not less than a predetermined value.

12. The steering control apparatus according to claim 11, wherein said field winding current instruction value is corrected in such a manner that it is decreased when said armature current deviation is not less than a first predetermined value, and it is increased when said armature current deviation is not greater than a second predetermined value.

13. The steering control apparatus according to claim 12, wherein said field winding current instruction value is limited to a preset minimum value.

14. The steering control apparatus according to claim 2, wherein said correction section corrects the current instruction value with a correction value which is determined through calculations.

15. The steering control apparatus according to claim 2, wherein said correction section corrects said current instruction value with a correction value which is obtained by referring to a table prepared in advance.

16. The steering control apparatus according to claim 2, wherein said d-axis current instruction value is limited to a value which is obtained by vector subtracting a q-axis current value from a preset maximum current vector value.

17. The steering control apparatus according to claim 2, wherein an integrated value of said deviation is used in place of said deviation.

18. The steering control apparatus according to claim 1, wherein said correction section corrects the current instruction value for controlling the magnetic field of said motor field magnet only when-a vehicle speed is not less than a predetermined value.

19. The steering control apparatus according to claim 1, wherein said correction section corrects the current instruction value for controlling the magnetic field of said motor field magnet only when a steering torque is not less than a predetermined value.

* * * * *